United States Patent
Zhang et al.

(10) Patent No.: US 10,237,132 B2
(45) Date of Patent: Mar. 19, 2019

(54) CONFIGURATION METHOD, NETWORK DEVICE, AND USER EQUIPMENT

(71) Applicant: Huawei Technologies Co., Ltd., Shenzhen (CN)

(72) Inventors: Tao Zhang, Beijing (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 17 days.

(21) Appl. No.: 15/270,349

(22) Filed: Sep. 20, 2016

(65) Prior Publication Data

US 2017/0012822 A1 Jan. 12, 2017

Related U.S. Application Data

(63) Continuation of application No. PCT/CN2014/073906, filed on Mar. 21, 2014.

(51) Int. Cl.
| | |
|---|---|
| *H04L 12/24* | (2006.01) |
| *H04L 12/64* | (2006.01) |
| *H04W 76/15* | (2018.01) |
| *H04W 76/11* | (2018.01) |
| *H04W 80/02* | (2009.01) |
| *H04W 88/02* | (2009.01) |
| *H04W 88/08* | (2009.01) |

(52) U.S. Cl.
CPC ...... *H04L 41/0823* (2013.01); *H04L 12/6418* (2013.01); *H04W 76/11* (2018.02); *H04W 76/15* (2018.02); *H04W 80/02* (2013.01); *H04W 88/02* (2013.01); *H04W 88/08* (2013.01)

(58) Field of Classification Search
CPC ...................................................... H04L 12/24
See application file for complete search history.

(56) References Cited

U.S. PATENT DOCUMENTS

| | | |
|---|---|---|
| 2012/0069750 A1 | 3/2012 | Xing et al. |
| 2015/0172963 A1 | 6/2015 | Kim et al. |

(Continued)

FOREIGN PATENT DOCUMENTS

| | | |
|---|---|---|
| CN | 1658542 A | 8/2005 |
| CN | 1984466 A | 6/2007 |

(Continued)

OTHER PUBLICATIONS

3GPP TS 36.331 V12.1.0 (Mar. 2014); 3rd Generation Partnership Project; Technical Specification Group Radio Access Network; Evolved Universal Terrestrial Radio Access (E-UTRA); Radio Resource Control (RRC); Protocol Specification (Release 12), 356 pages.

(Continued)

*Primary Examiner* — Brandon M Renner
(74) *Attorney, Agent, or Firm* — Slater Matsil, LLP

(57) ABSTRACT

Embodiments relate to the communications field, and provide a configuration method, a network device, and user equipment, so as to correctly configure different types of radio bearers and correctly configure a MAC entity. The method includes determining, by the network device, a configuration type and generating a first message according to the configuration type. The method also includes sending the first message to the user equipment. The method embodiment is used to configure a radio bearer.

6 Claims, 3 Drawing Sheets

(56) References Cited

U.S. PATENT DOCUMENTS

| | | | | |
|---|---|---|---|---|
| 2016/0183158 | A1* | 6/2016 | Decarreau | H04W 36/02 |
| | | | | 370/328 |
| 2017/0026982 | A1* | 1/2017 | Koskinen | H04W 72/12 |
| 2017/0142770 | A1* | 5/2017 | Fu | H04L 1/1614 |

FOREIGN PATENT DOCUMENTS

| | | |
|---|---|---|
| CN | 101360335 A | 2/2009 |
| CN | 102379145 A | 3/2012 |
| EP | 2018072 A1 | 1/2009 |
| KR | 20130082154 A | 7/2013 |
| WO | 2013190829 A1 | 12/2013 |

OTHER PUBLICATIONS

Huawei, et al., "Radio Bearer Configuration for Dual Connectivity", 3GPP TSG RAN WG2 Meeting #85, R2-140061, 7.2.1, Feb. 10 to Feb. 14, 2014, Prague, Czech Republic, 4 pages.

LG Electronics Inc., "Handling MAC Entitles for Dual Connectivity", 3GPP TSG-RAN WG2 Meeting #85, R2-140748, 7.2.1, Prague, Czech Republic, Feb. 10-Feb. 14, 2014, 3 pages.

Ericsson, "Signalling Procedures for Dual Connectivity", 3GPP TSG-RAN WG2 #84, Tdoc R2-134219, 7.2.2.1, San Francisco, USA, Nov. 11-15, 2013, 9 pages.

Fujitsu, "Handling of the MAC Entity at the UE", 3GPP TSG-RAN WG2 Meeting #85, R2-140218, 7.2.1, Prague, Czech Republic, Feb. 10-14, 2014, 3 pages.

NSN, Nokia Corporation, NTT Docomo, "Specifying Dual Connectivity", 3GPP TSG-RAN WG2 Meeting #85, R2-140050, 7.2.1, Prague, Czech Republic, Feb. 10-14, 2014, 6 pages.

Sharp, "DRB Relocation Between MCG and SCG", 3GPP TSG-RAN WG2#85, R2-140731, 7.2.2, Prague, Czech Republic, Feb. 10-14, 2014, 6 pages.

Media Tek Inc., "1A or 3C DRB Configuration with SCG Addition/Removal", 3GPP TSG-RAN2 #85 Meeting, R2-140600, 7.2.1, Prague, Czech Republic, Feb. 10-14, 2014, 5 pages.

Samsung, "Introduction of Dual Connectivity", 3GPP TSG-RAN2 Meeting #85, R2-140596, 36.331 CR CRNum rev—Current version: 12.0.0 Prague, Czech Republic, Feb. 10-14, 2014, 31 pages.

Samsung, "Dual Connectivity, RRC Signalling on Xn and Uu", 3GPP TSG-RAN2#85 meeting, Tdoc R2-140594, 7.2.2, Prague, Czech Republic, Feb. 10-14, 2014, 5 pages.

\* cited by examiner

CONFIGURATION METHOD, NETWORK DEVICE, AND USER EQUIPMENT

CROSS-REFERENCE TO RELATED APPLICATIONS

This application is a continuation of International Application No. PCT/CN2014/073906, filed on Mar. 21, 2014, the disclosure of which is hereby incorporated by reference in its entirety.

TECHNICAL FIELD

The present invention relates to the communications field, and in particular, to a configuration method, a network device, and user equipment.

BACKGROUND

With development of wireless network technologies, a new network architecture emerges. To improve throughput of user equipment, the user equipment may transmit data to two or more base stations simultaneously, where data transmitted between the user equipment and the two or more base stations is carried on one or more radio bearers. For the user equipment, among the two or more base stations, there is only one master base station, and the other base stations are secondary base stations, where only the master base station can generate a radio resource control message for configuring the user equipment, a cell group provided by the master base station to serve the user equipment is a master cell group, and a cell group provided by the secondary base station to serve the user equipment is a secondary cell group.

In the new network architecture, the user equipment may communicate with the master base station and the secondary base station by using three types of radio bearers, namely, a radio bearer (which is also referred to as a master cell group radio bearer or a first-type radio bearer) served only by the master cell group of the master base station, a radio bearer (which is also referred to as a secondary cell group radio bearer or a second-type radio bearer) served only by the secondary cell group of the secondary base station, and a radio bearer (which is also referred to as an offload radio bearer or a third-type radio bearer) served by the master cell group of the master base station and the secondary cell group of the secondary base station simultaneously. Meanwhile, the user equipment has multiple MAC (Medium Access Control) entities, where one MAC entity (which may be referred to as a MAC entity corresponding to the master cell group) corresponds to the master cell group, each of the other MAC entities (which may be referred to as a MAC entity corresponding to the secondary cell group) corresponds to one secondary cell group.

However, because in a conventional network architecture, there is only one type of radio bearers, and user equipment has only one MAC entity, a configuration method in the conventional network architecture cannot be used for correctly configuring different types of radio bearers or MAC entities in the new network architecture.

SUMMARY

Embodiments provide a configuration method, a network device, and user equipment, to correctly configure different types of radio bearers and correctly configure MAC entities.

To achieve the foregoing objective, the following technical solutions are used in the embodiments.

According to a first aspect, a network device is provided, including a determining unit, configured to determine a configuration type, where the configuration type refers to an operation that user equipment needs to perform on a radio bearer or on a Medium Access Control (MAC) entity corresponding to a secondary cell group. The network device also includes a generation unit, configured to generate a first message according to the configuration type determined by the determining unit, where the first message is used for instructing the user equipment to configure the radio bearer or the MAC entity. Additionally, the network device includes a sending unit, configured to send the first message generated by the generation unit to the user equipment.

According to a second aspect, user equipment is provided, including a receiving unit, configured to receive a first message sent by a network device, where the first message is used for instructing the user equipment to configure a radio bearer or configure a MAC entity corresponding to a secondary cell group. The user equipment also includes a determining unit, configured to determine a configuration type according to the first message received by the receiving unit, where the configuration type refers to an operation that the user equipment needs to perform on the radio bearer or on the MAC entity corresponding to the secondary cell group. Additionally, the user equipment includes a configuration unit, configured to configure the radio bearer or the MAC entity according to the configuration type determined by the determining unit.

According to a third aspect, a configuration method is provided, including: determining, by a network device, a configuration type, where the configuration type refers to an operation that user equipment needs to perform on a radio bearer or on a MAC entity corresponding to a secondary cell group; generating a first message according to the configuration type, where the first message is used for instructing the user equipment to configure the radio bearer or the MAC entity; and sending the first message to the user equipment.

According to a fourth aspect, a configuration method is provided, including: receiving, by user equipment, a first message sent by a network device, where the first message is used for instructing the user equipment to configure a radio bearer or configure a MAC entity corresponding to a secondary cell group; determining, according to the first message, a configuration type for configuring the radio bearer or the MAC entity, where the configuration type refers to an operation that the user equipment needs to perform on the radio bearer or on the MAC entity corresponding to the secondary cell group; and configuring the radio bearer or the MAC entity according to the configuration type.

According to a fifth aspect, a network device is provided, including: a transceiver, a processor, and a memory, where the memory stores a computer executable instruction, and the transceiver, the processor, and the memory are connected by using a communications bus; when the device runs, the processor is configured to determine a configuration type, and generate a first message according to the configuration type, where the configuration type refers to an operation that user equipment needs to perform on a radio bearer or on a MAC entity corresponding to a secondary cell group, and the first message is used for instructing the user equipment to configure the radio bearer or the MAC entity; and the transceiver is configured to send the first message generated by the processor to the user equipment.

According to a sixth aspect, user equipment is provided, including: a transceiver, a processor, and a memory, where the memory stores a computer executable instruction, and the transceiver, the processor, and the memory are connected by using a communications bus; when the equipment runs, the transceiver is configured to receive a first message sent by a network device, where the first message is used for instructing the user equipment to configure a radio bearer or configure a MAC entity corresponding to a secondary cell group; and the processor is configured to determine, according to the first message obtained by the transceiver, a configuration type for configuring the radio bearer or the MAC entity, and configure, according to the configuration type, a first-type radio bearer, a second-type radio bearer, and a third-type radio bearer or configure, according to the configuration type, the MAC entity corresponding to the secondary cell group, where the configuration type refers to an operation that the user equipment needs to perform on the radio bearer or on the MAC entity corresponding to the secondary cell group By using the foregoing solution, a network device determines a configuration type, generates a first message according to the configuration type, and sends the first message to user equipment; the user equipment receives the first message sent by the network device, determines, according to the first message, a configuration type for configuring a radio bearer or a MAC entity, and configures the radio bearer or the MAC entity according to the configuration type. In this way, the user equipment can correctly configure different types of radio bearers and correctly configure a MAC entity according to a first message sent by a base station.

BRIEF DESCRIPTION OF THE DRAWINGS

To describe the technical solutions in the embodiments more clearly, the following briefly introduces the accompanying drawings required for describing the embodiments. Apparently, the accompanying drawings in the following description show merely some embodiments, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments with reference to the accompanying drawings in the embodiments. Apparently, the described embodiments are merely some but not all of the embodiments. All other embodiments obtained by a person of ordinary skill in the art based on the embodiments without creative efforts shall fall within the protection scope.

The terms used in the embodiments are merely for the purpose of illustrating specific embodiments, and are not intended to limit the embodiments. The terms "a", "said" and "the" of singular forms used in the embodiments and the appended claims are also intended to include plural forms, unless otherwise specified in the context clearly. It should also be understood that, the term "and/or" used herein indicates and includes any or all possible combinations of one or more associated listed items.

It should be understood that, although in the embodiments, the terms "first", "second", "third", and the like may be used to describe various messages, and types and lists of radio bearers, these messages and these types and lists of radio bearers are not limited to these terms. These terms are used only to distinguish between messages and distinguish between types and lists of radio bearers. For example, within the scope of the embodiments, a first-type radio bearer may also be referred to as a second-type radio bearer, and similarly, a second-type radio bearer may also be referred to as a first-type radio bearer.

Depending on the context, for example, words "if" used herein may be explained as "while . . . " or "when . . . " or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

Figure 1:
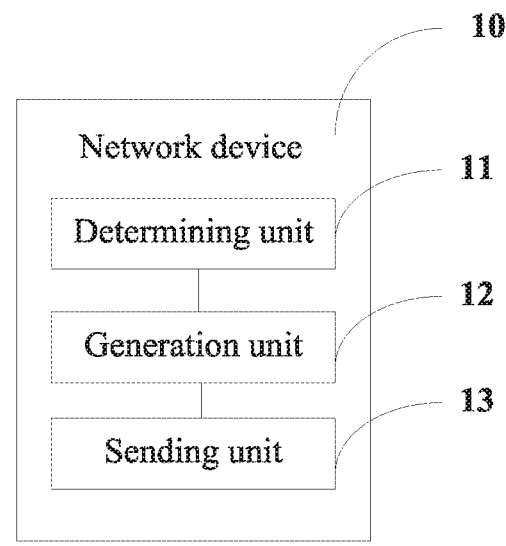
FIG. 1 is a schematic structural diagram of a network device according to an embodiment.

An embodiment provides a network device 10. As shown in FIG. 1, the network device 10 includes: a determining unit 11, configured to determine a configuration type, where the configuration type refers to an operation that user equipment needs to perform on a radio bearer or on a MAC entity corresponding to a secondary cell group; a generation unit 12, configured to generate a first message according to the configuration type determined by the determining unit 11, where the first message is used for instructing the user equipment to configure the radio bearer or the MAC entity; and a sending unit 13, configured to send the first message generated by the generation unit 12 to the user equipment.

The network device may be a base station, the base station may be a master base station, and the first message may be a radio resource control message.

Figure 5:
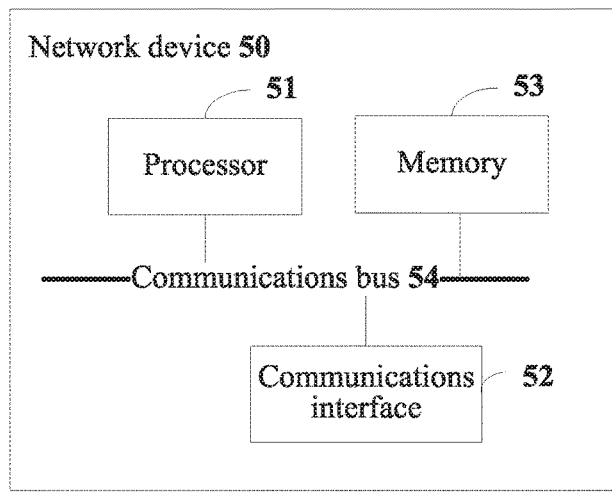
FIG. 5 is a schematic structural diagram of another network device according to an embodiment.

It should be noted that, functions of the determining unit and the generation unit may be implemented by using a processor of the network device; functions of the sending unit may be implemented by using a transceiver of the network device; for a connection relationship between the processor and the transceiver, refer to a network device shown in FIG. 5; and a communications interface in FIG. 5 includes the transceiver.

Specifically, there are three types of radio bearers, which are separately used for communicating with a master base station and a secondary base station that correspond to the user equipment. A first-type radio bearer may be a master cell group radio bearer, a second-type radio bearer may be a secondary cell group radio bearer, and a third-type radio bearer may be an offload radio bearer. The user equipment communicates with the master base station by using the master cell group radio bearer, communicates with the secondary base station by using the secondary cell group radio bearer, and simultaneously communicates with the master base station and the secondary base station by using the offload radio bearer. Current configuration is saved in the user equipment, where the current configuration is used for configuring the radio bearer.

The master cell group radio bearer includes one PDCP (Packet Data Convergence Protocol) entity, one RLC (Radio Link Control) entity, and one LCH (Logical Channel); the secondary cell group radio bearer includes one PDCP entity, one RLC entity, and one LCH; and the offload radio bearer includes one PDCP entity, two RLC entities, and two LCHs, where the LCH is a MAC (Medium Access Control) entity.

Further, when the network device determines the configuration type, one of the following factors may be considered: a measurement report sent by a terminal, a radio bearer type supported by the terminal, backbone network load between a master base station and a secondary base station, load of a core network, quality of service (QoS) of a radio bearer, load of a master eNodeB (MeNB), and load of a secondary eNodeB (SeNB).

For example, using impact of QoS of a radio bearer on establishment of the radio bearer as an example, if QoS of the radio bearer requires a high throughput, the network device determines to establish the radio bearer as a second-type radio bearer or a third-type radio bearer; or if QoS of the radio bearer requires a low throughput, the network device determines to establish the radio bearer as a first-type radio bearer.

For example, using impact of backbone network load between a master base station and a secondary base station on re-establishment of a radio bearer as an example, if the backbone network load between the master base station and the secondary base station is large, the network device determines to re-establish one or more third-type radio bearers as first-type or second-type radio bearers; or if the backbone network load between the master base station and the secondary base station is small, the network device determines to re-establish one or more first-type or second-type radio bearers as one third-type radio bearer.

For example, using impact of load of a core network on re-establishment of a radio bearer as an example, if the load of the core network is large, the network device determines to re-establish one or more second-type radio bearers as first-type or third-type radio bearers; or if the load of the core network is small, the network device determines to re-establish one or more first-type or third-type radio bearers as second-type radio bearers.

For example, using impact of load of a master base station on re-establishment of a radio bearer as an example, if the load of the master base station is large, the network device determines to re-establish one or more first-type or third-type radio bearers as second-type radio bearers; or if the load of the master base station is small, the network device determines to re-establish one or more second-type radio bearers as first-type or third-type radio bearers.

Further, the generation unit 12 may generate a corresponding control message (that is, the first message) after the configuration type is determined.

Optionally, the generation unit 12 is specifically configured to: when the determining unit 11 determines that the configuration type is establishing or reconfiguring a first-type radio bearer, acquire identity information of the radio bearer and a first radio bearer establishment and modification list, add the identity information to the first radio bearer establishment and modification list, and generate a first message including the first radio bearer establishment and modification list.

Optionally, the generation unit 12 is specifically configured to: when the determining unit 11 determines that the configuration type is establishing or reconfiguring a second-type radio bearer, acquire identity information of the radio bearer and a second radio bearer establishment and modification list, add the identity information to the second radio bearer establishment and modification list, and generate a first message including the second radio bearer establishment and modification list.

Optionally, the generation unit 12 is specifically configured to: when the determining unit 11 determines that the configuration type is establishing or reconfiguring a third-type radio bearer, acquire identity information of the radio bearer, a first radio bearer establishment and modification list, and a second radio bearer establishment and modification list, add the identity information to the first radio bearer establishment and modification list and the second radio bearer establishment and modification list, and generate a first message that includes the first radio bearer establishment and modification list and the second radio bearer establishment and modification list.

Optionally, the generation unit 12 is specifically configured to: when the determining unit 11 determines that the configuration type is releasing the radio bearer, acquire identity information of the radio bearer and a first radio bearer release list, add the identity information to the first radio bearer release list, and generate a first message including the first radio bearer release list.

Optionally, the generation unit 12 is specifically configured to: when the determining unit 11 determines that the configuration type is releasing the radio bearer, acquire identity information of the radio bearer and a second radio bearer release list, add the identity information to the second radio bearer release list, and generate a first message including the second radio bearer release list.

Optionally, the generation unit 12 is specifically configured to: when the determining unit 11 determines that the configuration type is releasing the radio bearer, acquire identity information of the radio bearer, a first radio bearer release list, and a second radio bearer release list, add the identity information to the first radio bearer release list and the second radio bearer release list, and generate a first message that includes the first radio bearer release list and the second radio bearer release list.

Optionally, the generation unit 12 is specifically configured to: when the determining unit 11 determines that the configuration type is re-establishing all established radio bearers corresponding to the user equipment as first-type radio bearers, generate a first message including a first re-establishment identity.

Optionally, the generation unit 12 is specifically configured to: when the determining unit 11 determines that the configuration type is re-establishing all established radio bearers corresponding to the user equipment as first-type radio bearers, acquire identity information of the radio bearer and a first-type radio bearer re-establishment list, add the identity information to the first-type radio bearer re-establishment list, and generate a first message including the first-type radio bearer re-establishment list.

Optionally, the generation unit 12 is specifically configured to: when the determining unit 11 determines that the configuration type is re-establishing all established radio bearers corresponding to the user equipment as first-type radio bearers, acquire identity information of the radio bearer, a first radio bearer release list, and a first radio bearer establishment and modification list, add the identity information to the first radio bearer release list and the first radio bearer establishment and modification list, and generate a first message that includes the first radio bearer release list and the first radio bearer establishment and modification list.

Optionally, the generation unit 12 is specifically configured to: when the determining unit 11 determines that the configuration type is re-establishing all established radio bearers corresponding to the user equipment as first-type radio bearers, acquire identity information of the radio bearer, identity information of an evolved packet system bearer corresponding to the identity information of the radio bearer, a first radio bearer release list, and a first radio bearer establishment and modification list, add the identity information of the radio bearer to the first radio bearer release list, add the identity information of the evolved packet system bearer to the first radio bearer establishment and modification list, and generate a first message that includes the first radio bearer release list and the first radio bearer establishment and modification list.

Optionally, the generation unit 12 is specifically configured to: when the determining unit 11 determines that the configuration type is re-establishing all established radio bearers corresponding to the user equipment as first-type radio bearers, acquire identity information of an evolved packet system bearer, a first radio bearer release list, and a first radio bearer establishment and modification list, add the identity information of the evolved packet system bearer to the first radio bearer release list and the first radio bearer establishment and modification list, and generate a first message that includes the first radio bearer release list and the first radio bearer establishment and modification list.

Optionally, the generation unit 12 is specifically configured to: when the determining unit 11 determines that the configuration type is re-establishing all established radio bearers corresponding to the user equipment as first-type radio bearers, acquire identity information of the radio bearer, a master cell group release identity, and a first radio bearer establishment and modification list, add the identity information of the radio bearer to the first radio bearer establishment and modification list, and generate a first message that includes the master cell group release identity and the first radio bearer establishment and modification list.

Optionally, the generation unit 12 is specifically configured to: when the determining unit 11 determines that the configuration type is re-establishing all established radio bearers corresponding to the user equipment as first-type radio bearers, acquire identity information of an evolved packet system bearer, a master cell group release identity, and a first radio bearer establishment and modification list, add the identity information of the evolved packet system bearer to the first radio bearer establishment and modification list, and generate a first message that includes the master cell group release identity and the first radio bearer establishment and modification list.

Optionally, the generation unit 12 is specifically configured to: when the determining unit 11 determines that the configuration type is re-establishing all established radio bearers corresponding to the user equipment as second-type radio bearers, generate a first message including a second re-establishment identity.

Optionally, the generation unit 12 is specifically configured to: when the determining unit 11 determines that the configuration type is re-establishing all established radio bearers corresponding to the user equipment as second-type radio bearers, acquire identity information of the radio bearer and a second-type radio bearer re-establishment list, add the identity information to the second-type radio bearer re-establishment list, and generate a first message including the second-type radio bearer re-establishment list.

Optionally, the generation unit 12 is specifically configured to: when the determining unit 11 determines that the configuration type is re-establishing all established radio bearers corresponding to the user equipment as second-type radio bearers, acquire identity information of the radio bearer, a first radio bearer release list, and a second radio bearer establishment and modification list, add the identity information to the first radio bearer release list and the second radio bearer establishment and modification list, and generate a first message that includes the first radio bearer release list and the second radio bearer establishment and modification list.

Optionally, the generation unit 12 is specifically configured to: when the determining unit 11 determines that the configuration type is re-establishing all established radio bearers corresponding to the user equipment as second-type radio bearers, acquire identity information of the radio bearer, a second radio bearer release list, and a second radio bearer establishment and modification list, add the identity information to the second radio bearer release list and the second radio bearer establishment and modification list, and generate a first message that includes the second radio bearer release list and the second radio bearer establishment and modification list.

Optionally, the generation unit 12 is specifically configured to: when the determining unit 11 determines that the configuration type is re-establishing all established radio bearers corresponding to the user equipment as second-type radio bearers, acquire identity information of the radio bearer, identity information of an evolved packet system bearer corresponding to the identity information of the radio bearer, a first radio bearer release list, and a second radio bearer establishment and modification list, add the identity information of the radio bearer to the first radio bearer release list, add the identity information of the evolved packet system bearer to the second radio bearer establishment and modification list, and generate a first message that includes the first radio bearer release list and the second radio bearer establishment and modification list.

Optionally, the generation unit 12 is specifically configured to: when the determining unit 11 determines that the configuration type is re-establishing all established radio bearers corresponding to the user equipment as second-type radio bearers, acquire identity information of the radio bearer, identity information of an evolved packet system bearer corresponding to the identity information of the radio bearer, a second radio bearer release list, and a second radio bearer establishment and modification list, add the identity information of the radio bearer to the second radio bearer release list, add the identity information of the evolved packet system bearer to the second radio bearer establishment and modification list, and generate a first message that includes the second radio bearer release list and the second radio bearer establishment and modification list.

Optionally, the generation unit 12 is specifically configured to: when the determining unit 11 determines that the configuration type is re-establishing all established radio bearers corresponding to the user equipment as second-type radio bearers, acquire identity information of an evolved packet system bearer, a first radio bearer release list, and a second radio bearer establishment and modification list, add the identity information of the evolved packet system bearer to the first radio bearer release list and the second radio bearer establishment and modification list, and generate a first message that includes the first radio bearer release list and the second radio bearer establishment and modification list.

Optionally, the generation unit 12 is specifically configured to: when the determining unit 11 determines that the configuration type is re-establishing all established radio bearers corresponding to the user equipment as second-type radio bearers, acquire identity information of an evolved packet system bearer, a second radio bearer release list, and a second radio bearer establishment and modification list, add the identity information of the evolved packet system bearer to the second radio bearer release list and the second radio bearer establishment and modification list, and generate a first message that includes the second radio bearer release list and the second radio bearer establishment and modification list.

Optionally, the generation unit 12 is specifically configured to: when the determining unit 11 determines that the configuration type is re-establishing all established radio bearers corresponding to the user equipment as second-type radio bearers, acquire identity information of the radio bearer, a secondary cell group release identity, and a second radio bearer establishment and modification list, add the identity information of the radio bearer to the second radio bearer establishment and modification list, and generate a first message that includes the secondary cell group release identity and the second radio bearer establishment and modification list.

Optionally, the generation unit 12 is specifically configured to: when the determining unit 11 determines that the configuration type is re-establishing all established radio bearers corresponding to the user equipment as second-type radio bearers, acquire identity information of an evolved packet system bearer, a secondary cell group release identity, and a second radio bearer establishment and modification list, add the identity information of the evolved packet system bearer to the second radio bearer establishment and modification list, and generate a first message that includes the secondary cell group release identity and the second radio bearer establishment and modification list.

Optionally, the generation unit 12 is specifically configured to: when the determining unit 11 determines that the configuration type is re-establishing all established radio bearers corresponding to the user equipment as third-type radio bearers, generate a first message including a third re-establishment identity.

Optionally, the generation unit 12 is specifically configured to: when the determining unit 11 determines that the configuration type is re-establishing all established radio bearers corresponding to the user equipment as third-type radio bearers, acquire identity information of the radio bearer and a third-type radio bearer re-establishment list, add the identity information to the third-type radio bearer re-establishment list, and generate a first message including the third-type radio bearer re-establishment list.

Optionally, the generation unit 12 is specifically configured to: when the determining unit 11 determines that the configuration type is re-establishing all established radio bearers corresponding to the user equipment as third-type radio bearers, acquire identity information of the radio bearer, a first radio bearer release list, a first radio bearer establishment and modification list, and a second radio bearer establishment and modification list, add the identity information of the radio bearer to the first radio bearer release list, the first radio bearer establishment and modification list, and the second radio bearer establishment and modification list, and generate a first message that includes the first radio bearer release list, the first radio bearer establishment and modification list, and the second radio bearer establishment and modification list.

Optionally, the generation unit 12 is specifically configured to: when the determining unit 11 determines that the configuration type is re-establishing all established radio bearers corresponding to the user equipment as third-type radio bearers, acquire identity information of the radio bearer, a first radio bearer release list, a second radio bearer release list, a first radio bearer establishment and modification list, and a second radio bearer establishment and modification list, add the identity information of the radio bearer to the first radio bearer release list, the second radio bearer release list, the first radio bearer establishment and modification list, and the second radio bearer establishment and modification list, and generate a first message that includes the first radio bearer release list, the second radio bearer release list, the first radio bearer establishment and modification list, and the second radio bearer establishment and modification list.

Optionally, the generation unit 12 is specifically configured to: when the determining unit 11 determines that the configuration type is re-establishing all established radio bearers corresponding to the user equipment as third-type radio bearers, acquire first identity information of the radio bearer, second identity information of the radio bearer, identity information of an evolved packet system bearer corresponding to the first identity information of the radio bearer, a first radio bearer release list, a first radio bearer establishment and modification list, and a second radio bearer establishment and modification list, add the first identity information of the radio bearer to the first radio bearer release list, add the second identity information of the radio bearer and the identity information of the evolved packet system bearer to the first radio bearer establishment and modification list, add the second identity information of the radio bearer to the second radio bearer establishment and modification list, and generate a first message that includes the first radio bearer release list, the first radio bearer establishment and modification list, and the second radio bearer establishment and modification list.

Optionally, the generation unit 12 is specifically configured to: when the determining unit 11 determines that the configuration type is re-establishing all established radio bearers corresponding to the user equipment as third-type radio bearers, acquire first identity information of the radio bearer, second identity information of the radio bearer, identity information of an evolved packet system bearer corresponding to the first identity information of the radio bearer, a first radio bearer release list, a second radio bearer release list, a first radio bearer establishment and modification list, and a second radio bearer establishment and modification list, add the first identity information of the radio bearer to the first radio bearer release list and the second radio bearer release list, add the second identity information of the radio bearer and the identity information of the evolved packet system bearer to the first radio bearer establishment and modification list, add the second identity information of the radio bearer to the second radio bearer establishment and modification list, and generate a first message that includes the first radio bearer release list, the second radio bearer release list, the first radio bearer establishment and modification list, and the second radio bearer establishment and modification list.

Optionally, the generation unit 12 is specifically configured to: when the determining unit 11 determines that the configuration type is re-establishing all established radio bearers corresponding to the user equipment as third-type radio bearers, acquire identity information of an evolved packet system bearer, identity information of a radio bearer corresponding to the evolved packet system bearer, a first radio bearer release list, a first radio bearer establishment and modification list, and a second radio bearer establishment and modification list, add the identity information of the evolved packet system bearer to the first radio bearer release list, add the identity information of the evolved packet system bearer and the identity information of the radio bearer to the first radio bearer establishment and modification list, add the identity information of the radio bearer to the second radio bearer establishment and modification list, and generate a first message that includes the first radio bearer release list, the first radio bearer establishment and modification list, and the second radio bearer establishment and modification list.

Optionally, the generation unit 12 is specifically configured to: when the determining unit 11 determines that the configuration type is re-establishing all established radio bearers corresponding to the user equipment as third-type radio bearers, acquire identity information of an evolved packet system bearer, identity information of a radio bearer corresponding to the evolved packet system bearer, a first radio bearer release list, a second radio bearer release list, a first radio bearer establishment and modification list, and a second radio bearer establishment and modification list, add the identity information of the evolved packet system bearer to the first radio bearer release list and the second radio bearer release list, add the identity information of the evolved packet system bearer and the identity information of the radio bearer to the first radio bearer establishment and modification list, add the identity information of the radio bearer to the second radio bearer establishment and modification list, and generate a first message that includes the first radio bearer release list, the second radio bearer release list, the first radio bearer establishment and modification list, and the second radio bearer establishment and modification list.

Optionally, the generation unit 12 is specifically configured to: when the determining unit 11 determines that the configuration type is re-establishing all established radio bearers corresponding to the user equipment as third-type radio bearers, acquire identity information of the radio bearer, a master cell group release identity, a first radio bearer establishment and modification list, and a second radio bearer establishment and modification list, add the identity information of the radio bearer to the first radio bearer establishment and modification list and the second radio bearer establishment and modification list, and generate a first message that includes the master cell group release identity, the first radio bearer establishment and modification list, and the second radio bearer establishment and modification list.

Optionally, the generation unit 12 is specifically configured to: when the determining unit 11 determines that the configuration type is re-establishing all established radio bearers corresponding to the user equipment as third-type radio bearers, acquire identity information of the radio bearer, a secondary cell group release identity, a first radio bearer establishment and modification list, and a second radio bearer establishment and modification list, add the identity information of the radio bearer to the first radio bearer establishment and modification list and the second radio bearer establishment and modification list, and generate a first message that includes the secondary cell group release identity, the first radio bearer establishment and modification list, and the second radio bearer establishment and modification list.

Optionally, the generation unit 12 is specifically configured to: when the determining unit 11 determines that the configuration type is re-establishing all established radio bearers corresponding to the user equipment as third-type radio bearers, acquire identity information of an evolved packet system bearer, identity information of a radio bearer corresponding to the identity information of the evolved packet system bearer, a master cell group release identity, a first radio bearer establishment and modification list, and a second radio bearer establishment and modification list, add the identity information of the evolved packet system bearer and the identity information of the radio bearer to the first radio bearer establishment and modification list, add the identity information of the radio bearer to the second radio bearer establishment and modification list, and generate a first message that includes the master cell group release identity, the first radio bearer establishment and modification list, and the second radio bearer establishment and modification list.

Optionally, the generation unit 12 is specifically configured to: when the determining unit 11 determines that the configuration type is re-establishing all established radio bearers corresponding to the user equipment as third-type radio bearers, acquire identity information of an evolved packet system bearer, identity information of a radio bearer corresponding to the identity information of the evolved packet system bearer, a secondary cell group release identity, a first radio bearer establishment and modification list, and a second radio bearer establishment and modification list, add the identity information of the evolved packet system bearer and the identity information of the radio bearer to the first radio bearer establishment and modification list, add the identity information of the radio bearer to the second radio bearer establishment and modification list, and generate a first message that includes the secondary cell group release identity, the first radio bearer establishment and modification list, and the second radio bearer establishment and modification list.

Optionally, the generation unit 12 is specifically configured to: when the determining unit 11 determines that the configuration type is establishing or reconfiguring the MAC entity corresponding to the secondary cell group, acquire an identity of the secondary cell group and a secondary cell group establishment and modification list, add the identity of the secondary cell group to the secondary cell group establishment and modification list, and generate a first message including the secondary cell group establishment and modification list.

Optionally, the generation unit 12 is specifically configured to: when the determining unit 11 determines that the configuration type is establishing or reconfiguring the MAC entity corresponding to the secondary cell group, acquiring a secondary cell group establishment and modification identity, and generating a first message including the secondary cell group establishment and modification identity.

Optionally, the generation unit 12 is specifically configured to: when the determining unit 11 determines that the configuration type is establishing or reconfiguring the MAC entity corresponding to the secondary cell group, acquire a secondary MAC configuration identity, and generate a first message including the secondary MAC configuration identity.

Optionally, the generation unit 12 is specifically configured to: when the determining unit 11 determines that the configuration type is releasing the MAC entity corresponding to the secondary cell group, acquire an identity of the secondary cell group and a secondary cell group release list, add the identity of the secondary cell group to the secondary cell group release list, and generate a first message including the secondary cell group release list.

Optionally, the generation unit 12 is specifically configured to: when the determining unit 11 determines that the configuration type is releasing the MAC entity corresponding to the secondary cell group, acquire a secondary cell group release identity, and generate a first message including the secondary cell group release identity.

Optionally, the generation unit 12 is specifically configured to: when the determining unit 11 determines that the configuration type is releasing the MAC entity corresponding to the secondary cell group, acquire a secondary MAC release identity, and generate a first message including the secondary MAC release identity.

Optionally, the generation unit 12 is specifically configured to: when the determining unit 11 determines that the configuration type is resetting the MAC entity corresponding to the secondary cell group, acquire an identity of the secondary cell group, a secondary cell group establishment and modification list, and a secondary cell group release list, add the identity of the secondary cell group to the secondary cell group establishment and modification list and the secondary cell group release list, and generate a first message that includes the secondary cell group establishment and modification list and the secondary cell group release list.

Optionally, the generation unit 12 is specifically configured to: when the determining unit 11 determines that the configuration type is resetting the MAC entity corresponding to the secondary cell group, acquire a secondary cell group establishment and modification identity and a secondary cell group release identity, and generate a first message that includes the secondary cell group establishment and modification identity and the secondary cell group release identity.

Optionally, the generation unit 12 is specifically configured to: when the determining unit 11 determines that the configuration type is resetting the MAC entity corresponding to the secondary cell group, acquire a secondary MAC configuration identity and a secondary cell group release identity, and generate a first message that includes the secondary MAC configuration identity and the secondary cell group release identity.

Optionally, the generation unit 12 is specifically configured to: when the determining unit 11 determines that the configuration type is resetting the MAC entity corresponding to the secondary cell group, acquire a secondary MAC configuration identity and a secondary MAC release identity, and generate a first message that includes the secondary MAC configuration identity and the secondary MAC release identity.

Optionally, the generation unit 12 is specifically configured to: when the determining unit 11 determines that the configuration type is resetting the MAC entity corresponding to the secondary cell group, acquire a secondary cell group reset identity, and generate a first message including the secondary cell group reset identity.

Optionally, the generation unit 12 is specifically configured to: when the determining unit 11 determines that the configuration type is resetting the MAC entity corresponding to the secondary cell group, acquire a secondary MAC reset identity, and generate a first message including the secondary MAC reset identity.

By using the foregoing network device, the network device determines a configuration type, generates a first message according to the configuration type, and sends the first message to user equipment. In this way, the user equipment can correctly configure different types of radio bearers and correctly configure a MAC entity according to a first message sent by a base station.

Figure 2:
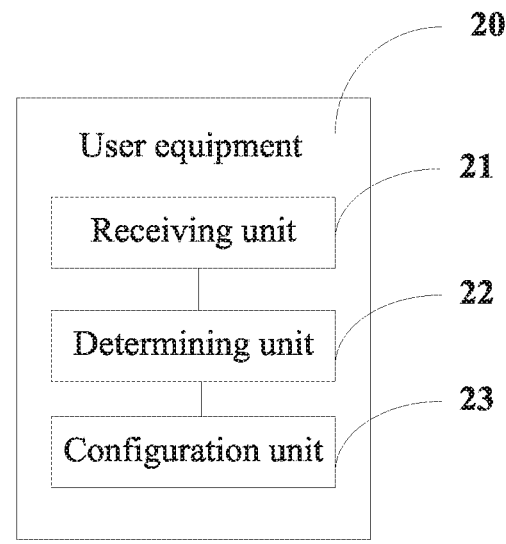
FIG. 2 is a schematic structural diagram of user equipment according to an embodiment.

An embodiment provides user equipment 20. As shown in FIG. 2, the user equipment 20 includes.

A receiving unit 21, configured to receive a first message sent by a network device.

The first message is used for instructing the user equipment to configure a radio bearer or a MAC entity corresponding to a secondary cell group.

A determining unit 22, configured to determine a configuration type according to the first message.

The configuration type refers to an operation that the user equipment needs to perform on the radio bearer or on the MAC entity corresponding to the secondary cell group.

A configuration unit 23, configured to configure, according to the configuration type, a first-type radio bearer, a second-type radio bearer, a third-type radio bearer, or configure, according to the configuration type, the MAC entity corresponding to the secondary cell group.

The network device may be a base station, the base station may be a master base station, and the first message may be a radio resource control message.

Figure 6:
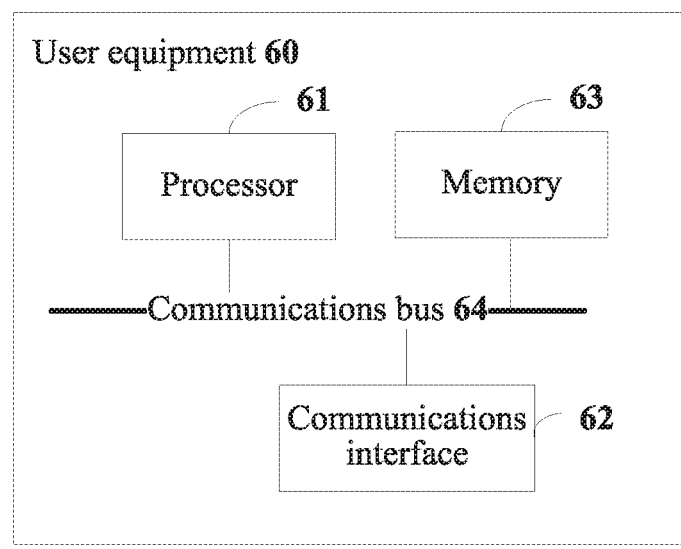
FIG. 6 is a schematic structural diagram of another user equipment according to an embodiment.

It should be noted that, functions of the determining unit and the configuration unit may be implemented by using a processor of the network device; functions of the receiving unit may be implemented by using a transceiver of the network device; for a connection relationship between the processor and the transceiver, refer to user equipment shown in FIG. 6; and a communications interface in FIG. 6 includes the transceiver.

Specifically, there are three types of radio bearers, which are separately used for communicating with a master base station and a secondary base station that correspond to the user equipment. A first-type radio bearer may be a master cell group radio bearer, a second-type radio bearer may be a secondary cell group radio bearer, and a third-type radio bearer may be an offload radio bearer. The user equipment communicates with the master base station by using the master cell group radio bearer, communicates with the secondary base station by using the secondary cell group radio bearer, and simultaneously communicates with the master base station and the secondary base station by using the offload radio bearer. Current configuration is saved in the user equipment, where the current configuration is used for configuring the radio bearer.

The master cell group radio bearer includes one PDCP (Packet Data Convergence Protocol) entity, one RLC (Radio Link Control) entity, and one LCH (Logical Channel); the secondary cell group radio bearer includes one PDCP entity, one RLC entity, and one LCH; and the offload radio bearer includes one PDCP entity, two RLC entities, and two LCHs, where the LCH is a MAC (Medium Access Control) entity.

Optionally, the determining unit 22 is specifically configured to: if the first message received by the receiving unit 21 includes a first radio bearer establishment and modification list, the first radio bearer establishment and modification list includes identity information of the radio bearer, and the identity information of the radio bearer is not in current configuration of the user equipment, determine that the configuration type is establishing a first-type radio bearer.

Optionally, the determining unit 22 is specifically configured to: if the first message received by the receiving unit 21 includes a second radio bearer establishment and modification list, the second radio bearer establishment and modification list includes identity information of the radio bearer, and the identity information of the radio bearer is not in current configuration of the user equipment, determine that the configuration type is establishing a second-type radio bearer.

Optionally, the determining unit 22 is specifically configured to: if the first message received by the receiving unit 21 includes a first radio bearer establishment and modification list and a second radio bearer establishment and modification list, the first radio bearer establishment and modification list includes identity information of the radio bearer, the second radio bearer establishment and modification list includes the identity information of the radio bearer, and the identity information of the radio bearer is not in current configuration of the user equipment, determine that the configuration type is establishing a third-type radio bearer.

Optionally, the determining unit 22 is specifically configured to: if the first message received by the receiving unit 21 includes a first radio bearer establishment and modification list, the first radio bearer establishment and modification list includes identity information of the radio bearer, and the identity information of the radio bearer is in current configuration of the user equipment, determine that the configuration type is reconfiguring radio bearer.

Optionally, the determining unit 22 is specifically configured to: if the first message received by the receiving unit 21 includes a second radio bearer establishment and modification list, the second radio bearer establishment and modification list includes identity information of the radio bearer, and the identity information of the radio bearer is in current configuration of the user equipment, determine that the configuration type is reconfiguring the radio bearer.

Optionally, the determining unit 22 is specifically configured to: if the first message received by the receiving unit 21 includes a first radio bearer establishment and modification list and a second radio bearer establishment and modification list, the first radio bearer establishment and modification list includes identity information of the radio bearer, the second radio bearer establishment and modification list includes the identity information of the radio bearer, and the identity information of the radio bearer is in current configuration of the user equipment, determine that the configuration type is reconfiguring the radio bearer.

Optionally, the determining unit 22 is specifically configured to: if the first message received by the receiving unit 21 includes a first radio bearer release list, the first radio bearer release list includes identity information of the radio bearer, and the identity information of the radio bearer is in current configuration of the user equipment, determine that the configuration type is releasing the radio bearer.

Optionally, the determining unit 22 is specifically configured to: if the first message received by the receiving unit 21 includes a second radio bearer release list, the second radio bearer release list includes identity information of the radio bearer, and the identity information of the radio bearer is in current configuration of the user equipment, determine that the configuration type is releasing the radio bearer.

Optionally, the determining unit 22 is specifically configured to: if the first message received by the receiving unit 21 includes a first radio bearer release list and a second radio bearer release list, the first radio bearer release list and the second radio bearer release list both include identity information of the radio bearer, and the identity information of the radio bearer is in current configuration of the user equipment, determine that the configuration type is releasing the radio bearer.

Optionally, the determining unit 22 is specifically configured to: if the first message received by the receiving unit 21 includes a first re-establishment identity, determine that the configuration type is re-establishing all established radio bearers corresponding to the user equipment as first-type radio bearers.

Optionally, the determining unit 22 is specifically configured to: if the first message received by the receiving unit 21 includes a second re-establishment identity, determine that the configuration type is re-establishing all established radio bearers corresponding to the user equipment as second-type radio bearers.

Optionally, the determining unit 22 is specifically configured to: if the first message received by the receiving unit 21 includes a third re-establishment identity, determine that the configuration type is re-establishing all established radio bearers corresponding to the user equipment as third-type radio bearers.

Optionally, the determining unit 22 is specifically configured to: if the first message received by the receiving unit 21 includes a first-type radio bearer re-establishment list, the first-type radio bearer re-establishment list includes identity information of the radio bearer, and the identity information of the radio bearer is in current configuration of the user equipment, determine that the configuration type is re-establishing the radio bearer as a first-type radio bearer.

Optionally, the determining unit 22 is specifically configured to: if the first message received by the receiving unit 21 includes a second-type radio bearer re-establishment list, the second-type radio bearer re-establishment list includes identity information of the radio bearer, and the identity information of the radio bearer is in current configuration of the user equipment, determine that the configuration type is re-establishing the radio bearer as a second-type radio bearer.

Optionally, the determining unit 22 is specifically configured to: if the first message received by the receiving unit 21 includes a third-type radio bearer re-establishment list, the third-type radio bearer re-establishment list includes identity information of the radio bearer, and the identity information of the radio bearer is in current configuration of the user equipment, determine that the configuration type is re-establishing the radio bearer as a third-type radio bearer.

Optionally, the determining unit 22 is specifically configured to: if the first message received by the receiving unit 21 includes a first radio bearer release list and a first radio bearer establishment and modification list, the first radio bearer release list and the first radio bearer establishment and modification list both include identity information of the radio bearer, and the identity information of the radio bearer is in current configuration of the user equipment, determine that the configuration type is re-establishing the radio bearer as a first-type radio bearer.

Optionally, the determining unit 22 is specifically configured to: if the first message received by the receiving unit 21 includes a first radio bearer release list and a second radio bearer establishment and modification list, the first radio bearer release list and the second radio bearer establishment and modification list both include identity information of the radio bearer, and the identity information of the radio bearer is in current configuration of the user equipment, determine that the configuration type is re-establishing the radio bearer as a second-type radio bearer.

Optionally, the determining unit 22 is specifically configured to: if the first message received by the receiving unit 21 includes a second radio bearer release list and a second radio bearer establishment and modification list, the second radio bearer release list and the second radio bearer establishment and modification list both include identity information of the radio bearer, and the identity information of the radio bearer is in current configuration of the user equipment, determine that the configuration type is re-establishing the radio bearer as a second-type radio bearer.

Optionally, the determining unit 22 is specifically configured to: if the first message received by the receiving unit 21 includes a first radio bearer release list, a first radio bearer establishment and modification list, and a second radio bearer establishment and modification list, the first radio bearer release list, the first radio bearer establishment and modification list, and the second radio bearer establishment and modification list all include identity information of the radio bearer, and the identity information of the radio bearer is in current configuration of the user equipment, determine that the configuration type is re-establishing the radio bearer as a third-type radio bearer.

Optionally, the determining unit 22 is specifically configured to: if the first message received by the receiving unit 21 includes a first radio bearer release list, a second radio bearer release list, a first radio bearer establishment and modification list, and a second radio bearer establishment and modification list, the first radio bearer release list, the second radio bearer release list, the first radio bearer establishment and modification list, and the second radio bearer establishment and modification list all include identity information of the radio bearer, and the identity information of the radio bearer is in current configuration of the user equipment, determine that the configuration type is re-establishing the radio bearer as a third-type radio bearer.

Optionally, the determining unit 22 is specifically configured to: if the first message received by the receiving unit 21 includes a first radio bearer release list and a first radio bearer establishment and modification list, the first radio bearer release list includes identity information of the radio bearer, the first radio bearer establishment and modification list includes identity information of an evolved packet system bearer corresponding to the identity information of the radio bearer, and the identity information of the radio bearer is in current configuration of the user equipment, determine that the configuration type is re-establishing the radio bearer as a first-type radio bearer.

Optionally, the determining unit 22 is specifically configured to: if the first message received by the receiving unit 21 includes a first radio bearer release list and a second radio bearer establishment and modification list, the first radio bearer release list includes identity information of the radio bearer, the second radio bearer establishment and modification list includes identity information of an evolved packet system bearer corresponding to the identity information of the radio bearer, and the identity information of the radio bearer is in current configuration of the user equipment, determine that the configuration type is re-establishing the radio bearer as a second-type radio bearer.

Optionally, the determining unit 22 is specifically configured to: if the first message received by the receiving unit 21 includes a second radio bearer release list and a second radio bearer establishment and modification list, the second radio bearer release list includes identity information of the radio bearer, the second radio bearer establishment and modification list includes identity information of an evolved packet system bearer corresponding to the identity information of the radio bearer, and the identity information of the radio bearer is in current configuration of the user equipment, determine that the configuration type is re-establishing the radio bearer as a second-type radio bearer.

Optionally, the determining unit 22 is specifically configured to: if the first message received by the receiving unit 21 includes a first radio bearer release list, a first radio bearer establishment and modification list, and a second radio bearer establishment and modification list, the first radio bearer release list includes first identity information of the radio bearer, the first radio bearer establishment and modification list includes identity information of an evolved packet system bearer corresponding to the first identity information of the radio bearer and includes second identity information of the radio bearer, the second radio bearer establishment and modification list includes the second identity information of the radio bearer, and the first identity information of the radio bearer is in current configuration of the user equipment, determine that the configuration type is re-establishing the radio bearer as a third-type radio bearer.

Optionally, the determining unit 22 is specifically configured to: if the first message received by the receiving unit 21 includes a first radio bearer release list, a second radio bearer release list, a first radio bearer establishment and modification list, and a second radio bearer establishment and modification list, the first radio bearer release list and the second radio bearer release list both include first identity information of the radio bearer, the first radio bearer establishment and modification list includes identity information of an evolved packet system bearer corresponding to the first identity information of the radio bearer and includes second identity information of the radio bearer, the second radio bearer establishment and modification list includes the second identity information of the radio bearer, and the first identity information of the radio bearer is in current configuration of the user equipment, determine that the configuration type is re-establishing the radio bearer as a third-type radio bearer.

Optionally, the determining unit 22 is specifically configured to: if the first message received by the receiving unit 21 includes a first radio bearer release list and a first radio bearer establishment and modification list, the first radio bearer release list includes identity information of an evolved packet system bearer, the first radio bearer establishment and modification list includes the identity information of the evolved packet system bearer, and the identity information of the evolved packet system bearer is in current configuration of the user equipment, determine that the configuration type is re-establishing a radio bearer corresponding to the evolved packet system bearer as a first-type radio bearer.

Optionally, the determining unit 22 is specifically configured to: if the first message received by the receiving unit 21 includes a first radio bearer release list and a second radio bearer establishment and modification list, the first radio bearer release list includes identity information of an evolved packet system bearer, the second radio bearer establishment and modification list includes the identity information of the evolved packet system bearer, and the identity information of the evolved packet system bearer is in current configuration of the user equipment, determine that the configuration type is re-establishing a radio bearer corresponding to the evolved packet system bearer as a second-type radio bearer.

Optionally, the determining unit 22 is specifically configured to: if the first message received by the receiving unit 21 includes a second radio bearer release list and a second radio bearer establishment and modification list, the second radio bearer release list includes identity information of an evolved packet system bearer, the second radio bearer establishment and modification list includes the identity information of the evolved packet system bearer, and the identity information of the evolved packet system bearer is in current configuration of the user equipment, determine that the configuration type is re-establishing a radio bearer corresponding to the evolved packet system bearer as a second-type radio bearer.

Optionally, the determining unit 22 is specifically configured to: if the first message received by the receiving unit 21 includes a first radio bearer release list, a first radio bearer establishment and modification list, and a second radio bearer establishment and modification list, the first radio bearer release list includes identity information of an evolved packet system bearer, the first radio bearer establishment and modification list includes the identity information of the evolved packet system bearer and includes identity information of a radio bearer corresponding to the evolved packet system bearer, the second radio bearer establishment and modification list includes the identity information of the radio bearer, and the identity information of the evolved packet system bearer is in current configuration of the user equipment, determine that the configuration type is re-establishing a radio bearer corresponding to the evolved packet system bearer as a third-type radio bearer.

Optionally, the determining unit 22 is specifically configured to: if the first message received by the receiving unit 21 includes a first radio bearer release list, a second radio bearer release list, a first radio bearer establishment and modification list, and a second radio bearer establishment and modification list, the first radio bearer release list and the second radio bearer release list both include identity information of an evolved packet system bearer, the first radio bearer establishment and modification list includes the identity information of the evolved packet system bearer and includes identity information of a radio bearer corresponding to the evolved packet system bearer, the second radio bearer establishment and modification list includes the identity information of the radio bearer, and the identity information of the evolved packet system bearer is in current configuration of the user equipment, determine that the configuration type is re-establishing a radio bearer corresponding to the evolved packet system bearer as a third-type radio bearer.

Optionally, the determining unit 22 is specifically configured to: if the first message received by the receiving unit 21 includes a master cell group release identity and a first radio bearer establishment and modification list, the first radio bearer establishment and modification list includes identity information of the radio bearer, and the identity information of the radio bearer is in current configuration of the user equipment, determine that the configuration type is re-establishing the radio bearer as a first-type radio bearer.

Optionally, the determining unit 22 is specifically configured to: if the first message received by the receiving unit 21 includes a secondary cell group release identity and a second radio bearer establishment and modification list, the second radio bearer establishment and modification list includes identity information of the radio bearer, and the identity information of the radio bearer is in current configuration of the user equipment, determine that the configuration type is re-establishing the radio bearer as a second-type radio bearer.

Optionally, the determining unit 22 is specifically configured to: if the first message received by the receiving unit 21 includes a master cell group release identity, a first radio bearer establishment and modification list, and a second radio bearer establishment and modification list, the first radio bearer establishment and modification list and the second radio bearer establishment and modification list both include identity information of the radio bearer, and the identity information of the radio bearer is in current configuration of the user equipment, determine that the configuration type is re-establishing the radio bearer as a third-type radio bearer.

Optionally, the determining unit 22 is specifically configured to: if the first message received by the receiving unit 21 includes a secondary cell group release identity, a first radio bearer establishment and modification list, and a second radio bearer establishment and modification list, the first radio bearer establishment and modification list and the second radio bearer establishment and modification list both include identity information of the radio bearer, and the identity information of the radio bearer is in current configuration of the user equipment, determine that the configuration type is re-establishing the radio bearer as a third-type radio bearer.

Optionally, the determining unit 22 is specifically configured to: if the first message received by the receiving unit 21 includes a master cell group release identity and a first radio bearer establishment and modification list, the first radio bearer establishment and modification list includes identity information of an evolved packet system bearer, and the identity information of the evolved packet system bearer is in current configuration of the user equipment, determine that the configuration type is re-establishing a radio bearer corresponding to the evolved packet system bearer as a first-type radio bearer.

Optionally, the determining unit 22 is specifically configured to: if the first message received by the receiving unit 21 includes a secondary cell group release identity and a second radio bearer establishment and modification list, the second radio bearer establishment and modification list includes identity information of an evolved packet system bearer, and the identity information of the evolved packet system bearer is in current configuration of the user equipment, determine that the configuration type is re-establishing a radio bearer corresponding to the evolved packet system bearer as a second-type radio bearer.

Optionally, the determining unit 22 is specifically configured to: if the first message received by the receiving unit 21 includes a master cell group release identity, a first radio bearer establishment and modification list, and a second radio bearer establishment and modification list, the first radio bearer establishment and modification list includes identity information of an evolved packet system bearer and includes identity information of a radio bearer corresponding to the identity information of the evolved packet system bearer, the second radio bearer establishment and modification list includes the identity information of the radio bearer, and the identity information of the evolved packet system bearer is in current configuration of the user equipment, determine that the configuration type is re-establishing a radio bearer corresponding to the evolved packet system bearer as a third-type radio bearer.

Optionally, the determining unit 22 is specifically configured to: if the first message received by the receiving unit 21 includes a secondary cell group release identity, a first radio bearer establishment and modification list, and a second radio bearer establishment and modification list, the first radio bearer establishment and modification list includes identity information of an evolved packet system bearer and includes identity information of a radio bearer corresponding to the identity information of the evolved packet system bearer, the second radio bearer establishment and modification list includes the identity information of the radio bearer, and the identity information of the evolved packet system bearer is in current configuration of the user equipment, determine that the configuration type is re-establishing a radio bearer corresponding to the evolved packet system bearer as a third-type radio bearer.

Optionally, the determining unit 22 is specifically configured to: if the first message received by the receiving unit 21 includes a secondary cell group establishment and modification list, the secondary cell group establishment and modification list includes an identity of the secondary cell group, and the identity of the secondary cell group is not in current configuration of the user equipment, determine that the configuration type is establishing the MAC entity corresponding to the secondary cell group.

Optionally, the determining unit 22 is specifically configured to: if the first message received by the receiving unit 21 includes a secondary cell group establishment and modification list, the secondary cell group establishment and modification list includes an identity of the secondary cell group, and the identity of the secondary cell group is in current configuration of the user equipment, determine that the configuration type is reconfiguring the MAC entity corresponding to the secondary cell group.

Optionally, the determining unit 22 is specifically configured to: if the first message received by the receiving unit 21 includes a secondary cell group release list, the secondary cell group release list includes an identity of the secondary cell group, and the identity of the secondary cell group is in current configuration of the user equipment, determine that the configuration type is releasing the MAC entity corresponding to the secondary cell group.

Optionally, the determining unit 22 is specifically configured to: if the first message received by the receiving unit 21 includes a secondary cell group establishment and modification list and a secondary cell group release list, the secondary cell group establishment and modification list and the secondary cell group release list both include an identity of the secondary cell group, and the identity of the secondary cell group is in current configuration of the user equipment, determine that the configuration type is resetting the MAC entity corresponding to the secondary cell group.

Optionally, the determining unit 22 is specifically configured to: if the first message received by the receiving unit 21 includes a secondary cell group establishment and modification identity or a secondary MAC configuration identity, and the MAC entity corresponding to the secondary cell group is not established, determine that the configuration type is establishing the MAC entity.

Optionally, the determining unit 22 is specifically configured to: if the first message received by the receiving unit 21 includes a secondary cell group establishment and modification identity or a secondary MAC configuration identity, and the MAC entity corresponding to the secondary cell group is already established, determine that the configuration type is reconfiguring the MAC entity.

Optionally, the determining unit 22 is specifically configured to: if the first message received by the receiving unit 21 includes a secondary cell group release identity or a secondary MAC release identity, and the MAC entity corresponding to the secondary cell group is already established, determine that the configuration type is releasing the MAC entity.

Optionally, the determining unit 22 is specifically configured to: if the first message received by the receiving unit 21 includes a secondary cell group establishment and modification identity and a secondary cell group release identity, and the MAC entity corresponding to the secondary cell group is already established, determine that the configuration type is resetting the MAC entity.

Optionally, the determining unit 22 is specifically configured to: if the first message received by the receiving unit 21 includes a secondary MAC configuration identity and a secondary cell group release identity, and the MAC entity corresponding to the secondary cell group is already established, determine that the configuration type is resetting the MAC entity.

Optionally, the determining unit 22 is specifically configured to: if the first message received by the receiving unit 21 includes a secondary MAC configuration identity and a secondary MAC release identity, and the MAC entity corresponding to the secondary cell group is already established, determine that the configuration type is resetting the MAC entity.

Optionally, the determining unit 22 is specifically configured to: if the first message received by the receiving unit 21 includes a secondary cell group reset identity or a secondary MAC reset identity, and the MAC entity corresponding to the secondary cell group is already established, determine that the configuration type is resetting the MAC entity.

Further, after determining the configuration type, the user equipment configures, according to the configuration type, the radio bearer or configures, according to the configuration type, the MAC entity corresponding to the secondary cell group, and sends a message to a non-access stratum to indicate that configuration of the radio bearer is completed, so as to notify a network that the user equipment completes a corresponding configuration operation.

Specifically, when determining to establish a master cell group radio bearer, the configuration unit 23 establishes a PDCP-1, establishes an RLC-1 and an LCH-M, and indicates to the non-access stratum that the radio bearer is established, where the LCH-M is an LCH in a MAC entity corresponding to a master cell group.

When determining to establish a secondary cell group radio bearer, the configuration unit 23 establishes a PDCP-1, establishes an RLC-1 and an LCH-S, and indicates to the non-access stratum that the radio bearer is established, where the LCH-S is an LCH in the MAC entity corresponding to the secondary cell group.

When determining to establish an offload radio bearer, the configuration unit 23 establishes a PDCP-1, establishes an RLC-1 and an RLC-2, establishes an LCH-M and an LCH-S, and indicates to the non-access stratum that the radio bearer is established.

Optionally, when determining to reconfigure the master cell group radio bearer, the configuration unit 23 reconfigures the PDCP-1, the RLC-1, or the LCH-M.

Optionally, when determining to reconfigure the secondary cell group radio bearer, the configuration unit 23 reconfigures the PDCP-1, the RLC-1, or the LCH-S.

Optionally, when determining to reconfigure the offload radio bearer, the configuration unit 23 reconfigures the PDCP-1, the RLC-1, the RLC-2, the LCH-M, or the LCH-S.

Optionally, when determining to release the master cell group radio bearer, the configuration unit 23 releases the PDCP-1, the RLC-1, and the LCH-M, and indicates to the non-access stratum that the radio bearer is released.

Optionally, when determining to release the secondary cell group radio bearer, the configuration unit 23 releases the PDCP-1, the RLC-1, and the LCH-S, and indicates to the non-access stratum that the radio bearer is released.

Optionally, when determining to release the offload radio bearer, the configuration unit 23 releases the PDCP-1, releases the RLC-1 and the RLC-2, releases the LCH-M and the LCH-S, and indicates to the non-access stratum that the radio bearer is released.

Optionally, when determining to re-establish the master cell group radio bearer as a master cell group radio bearer, the configuration unit 23 re-establishes the PDCP-1 and the RLC-1; when determining to re-establish the secondary cell group radio bearer as a master cell group radio bearer, the configuration unit 23 re-establishes the PDCP-1 and the RLC-1, establishes the LCH-M, and releases the LCH-S; or when determining to re-establish the offload radio bearer as a master cell group radio bearer, the configuration unit 23 may re-establish the PDCP-1, the RLC-1, and the RLC-2, and release the RLC-2 and the LCH-S.

It should be noted that, the user equipment re-establishes the RLC-2, so that the RLC entity transfers received data to the PDCP; after the data is transferred to the PDCP, the RLC-2 is ineffective, and the user equipment releases the RLC-2.

Optionally, when determining to re-establish the master cell group radio bearer as a secondary cell group radio bearer, the configuration unit 23 re-establishes the PDCP-1 and the RLC-1, establishes the LCH-S, and releases the LCH-M; when determining to re-establish the secondary cell group radio bearer as a secondary cell group radio bearer, the configuration unit 23 re-establishes the PDCP-1 and the RLC-1; or when determining to re-establish the offload radio bearer as a secondary cell group radio bearer, the configuration unit 23 re-establishes the PDCP-1 and the RLC-2, and the configuration unit 23 may re-establish the RLC-1, and release the RLC-1 and the LCH-M.

Optionally, when determining to re-establish the master cell group radio bearer as an offload radio bearer, the configuration unit 23 establishes the RLC-2 and the LCH-S; when determining to re-establish the secondary cell group radio bearer as an offload radio bearer, the configuration unit 23 re-establishes the PDCP-1 and the RLC-1, and establishes the RLC-2 and the LCH-M; or when determining to re-establish the offload radio bearer as an offload radio bearer, the configuration unit 23 may re-establish the PDCP-1, the RLC-1, and the RLC-2.

It should be noted that, in the process of the foregoing operations, the user equipment may send a PDCP status report to the network device, and the configuration unit 23 may reconfigure the PDCP-1, the RLC, the RLC-2, the LCH-M, or the LCH-S, which is not limited in this embodiment.

Optionally, the configuration unit 23 may perform an operation, according to the configuration type, on the MAC entity corresponding to the secondary cell group.

By using the foregoing user equipment, the user equipment receives a first message sent by a network device, determines a configuration type according to the first message, and configures, according to the configuration type, a first-type radio bearer, a second-type radio bearer, and a third-type radio bearer, or configures, according to the configuration type, a MAC entity corresponding to a secondary cell group. In this way, the user equipment can correctly configure different types of radio bearers and correctly configure the MAC entity according to a radio resource control message sent by a base station.

Figure 3:
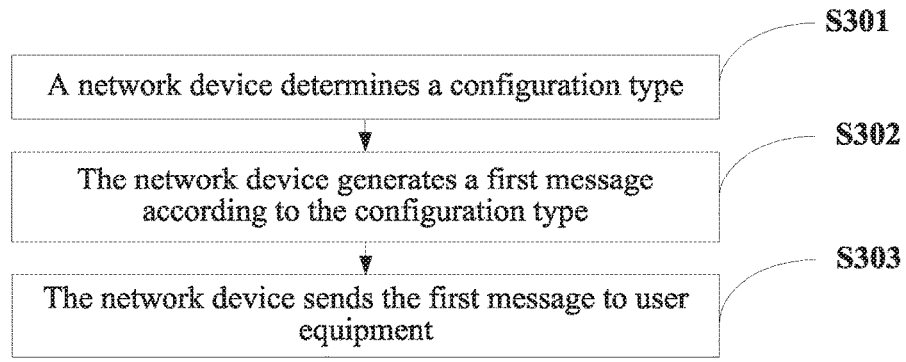
FIG. 3 is a schematic flowchart of a configuration method according to an embodiment.

An embodiment provides a configuration method. As shown in FIG. 3, the method is executed by a network device, and the method includes.

S301: The network device determines a configuration type.

The configuration type refers to an operation that user equipment needs to perform on a radio bearer or on a MAC entity corresponding to a secondary cell group.

Specifically, there are three types of radio bearers, which are separately used for communicating with a master base station and a secondary base station that correspond to the user equipment. A first-type radio bearer may be a master cell group radio bearer, a second-type radio bearer may be a secondary cell group radio bearer, and a third-type radio bearer may be an offload radio bearer. The user equipment communicates with the master base station by using the master cell group radio bearer, communicates with the secondary base station by using the secondary cell group radio bearer, and simultaneously communicates with the master base station and the secondary base station by using the offload radio bearer. Current configuration is saved in the user equipment, where the current configuration is used for configuring the radio bearer.

The master cell group radio bearer includes one PDCP (Packet Data Convergence Protocol) entity, one RLC (Radio Link Control) entity, and one LCH (Logical Channel); the secondary cell group radio bearer includes one PDCP entity, one RLC entity, and one LCH; and the offload radio bearer includes one PDCP entity, two RLC entities, and two LCHs, where the LCH is a MAC (Medium Access Control) entity.

Further, when the network device determines the configuration type, one of the following factors may be considered: a measurement report sent by a terminal, a radio bearer type supported by the terminal, backbone network load between a master base station and a secondary base station, load of a core network, quality of service (QoS) of a radio bearer, load of a MeNB, and load of a SeNB.

For example, using impact of QoS of a radio bearer on establishment of the radio bearer as an example, if QoS of the radio bearer requires a high throughput, the network device determines to establish the radio bearer as a second-type radio bearer or a third-type radio bearer; or if QoS of the radio bearer requires a low throughput, the network device determines to establish the radio bearer as a first-type radio bearer.

For example, using impact of backbone network load between a master base station and a secondary base station on re-establishment of a radio bearer as an example, if the backbone network load between the master base station and the secondary base station is large, the network device determines to re-establish one or more third-type radio bearers as first-type or second-type radio bearers; or if the backbone network load between the master base station and the secondary base station is small, the network device determines to re-establish one or more first-type or second-type radio bearers as one third-type radio bearer.

For example, using impact of load of a core network on re-establishment of a radio bearer as an example, if the load of the core network is large, the network device determines to re-establish one or more second-type radio bearers as first-type or third-type radio bearers; or if the load of the core network is small, the network device determines to re-establish one or more first-type or third-type radio bearers as second-type radio bearers.

For example, using impact of load of a master base station on re-establishment of a radio bearer as an example, if the load of the master base station is large, the network device determines to re-establish one or more first-type or third-type radio bearers as second-type radio bearers; or if the load of the master base station is small, the network device determines to re-establish one or more second-type radio bearers as first-type or third-type radio bearers.

S302: The network device generates a first message according to the configuration type.

The first message is used for instructing the user equipment to configure the radio bearer or the MAC entity.

Optionally, when the determining unit determines that the configuration type is establishing or reconfiguring a first-type radio bearer, identity information of the radio bearer and a first radio bearer establishment and modification list are acquired, the identity information of the radio bearer is added to the first radio bearer establishment and modification list, and a first message including the first radio bearer establishment and modification list is generated.

Optionally, when the determining unit determines that the configuration type is establishing or reconfiguring a second-type radio bearer, identity information of the radio bearer and a second radio bearer establishment and modification list are acquired, the identity information is added to the second radio bearer establishment and modification list, and a first message including the second radio bearer establishment and modification list is generated.

Optionally, when the determining unit determines that the configuration type is establishing or reconfiguring a third-type radio bearer, identity information of the radio bearer, a first radio bearer establishment and modification list, and a second radio bearer establishment and modification list are acquired, the identity information is added to the first radio bearer establishment and modification list and the second radio bearer establishment and modification list, and a first message that includes the first radio bearer establishment and modification list and the second radio bearer establishment and modification list is generated.

Optionally, when the determining unit determines that the configuration type is releasing the radio bearer, identity information of the radio bearer and a first radio bearer release list are acquired, the identity information is added to the first radio bearer release list, and a first message including the first radio bearer release list is generated.

Optionally, when the determining unit determines that the configuration type is releasing the radio bearer, identity information of the radio bearer and a second radio bearer release list are acquired, the identity information is added to the second radio bearer release list, and a first message including the second radio bearer release list is generated.

Optionally, when the determining unit determines that the configuration type is releasing the radio bearer, identity information of the radio bearer, a first radio bearer release list, and a second radio bearer release list are acquired, the identity information is added to the first radio bearer release list and the second radio bearer release list, and a first message that includes the first radio bearer release list and the second radio bearer release list is generated.

Optionally, when the determining unit determines that the configuration type is re-establishing all established radio bearers corresponding to the user equipment as first-type radio bearers, a first message, including a first re-establishment identity, is generated.

Optionally, when the determining unit determines that the configuration type is re-establishing all established radio bearers corresponding to the user equipment as first-type radio bearers, identity information of the radio bearer and a first-type radio bearer re-establishment list are acquired, the identity information is added to the first-type radio bearer re-establishment list, and a first message including the first-type radio bearer re-establishment list is generated.

Optionally, when the determining unit determines that the configuration type is re-establishing all established radio bearers corresponding to the user equipment as first-type radio bearers, identity information of the radio bearer, a first radio bearer release list, and a first radio bearer establishment and modification list are acquired, the identity information is added to the first radio bearer release list and the first radio bearer establishment and modification list, and a first message that includes the first radio bearer release list and the first radio bearer establishment and modification list is generated.

Optionally, when the determining unit determines that the configuration type is re-establishing all established radio bearers corresponding to the user equipment as first-type radio bearers, identity information of the radio bearer, identity information of an evolved packet system bearer corresponding to the identity information of the radio bearer, a first radio bearer release list, and a first radio bearer establishment and modification list are acquired, the identity information of the radio bearer is added to the first radio bearer release list, the identity information of the evolved packet system bearer is added to the first radio bearer establishment and modification list, and a first message that includes the first radio bearer release list and the first radio bearer establishment and modification list is generated.

Optionally, when the determining unit determines that the configuration type is re-establishing all established radio bearers corresponding to the user equipment as first-type radio bearers, identity information of an evolved packet system bearer, a first radio bearer release list, and a first radio bearer establishment and modification list are acquired, the identity information of the evolved packet system bearer is added to the first radio bearer release list and the first radio bearer establishment and modification list, and a first message that includes the first radio bearer release list and the first radio bearer establishment and modification list is generated.

Optionally, when the determining unit determines that the configuration type is re-establishing all established radio bearers corresponding to the user equipment as first-type radio bearers, identity information of the radio bearer, a master cell group release identity, and a first radio bearer establishment and modification list are acquired, the identity information of the radio bearer is added to the first radio bearer establishment and modification list, and a first message that includes the master cell group release identity and the first radio bearer establishment and modification list is generated.

Optionally, when the determining unit determines that the configuration type is re-establishing all established radio bearers corresponding to the user equipment as first-type radio bearers, identity information of an evolved packet system bearer, a master cell group release identity, and a first radio bearer establishment and modification list are acquired, the identity information of the evolved packet system bearer is added to the first radio bearer establishment and modification list, and a first message that includes the master cell group release identity and the first radio bearer establishment and modification list is generated.

Optionally, when the determining unit determines that the configuration type is re-establishing all established radio bearers corresponding to the user equipment as second-type radio bearers, a first message, including a second re-establishment identity, is generated.

Optionally, when the determining unit determines that the configuration type is re-establishing all established radio bearers corresponding to the user equipment as second-type radio bearers, identity information of the radio bearer and a second-type radio bearer re-establishment list are acquired, the identity information is added to the second-type radio bearer re-establishment list, and a first message including the second-type radio bearer re-establishment list is generated.

Optionally, when the determining unit determines that the configuration type is re-establishing all established radio bearers corresponding to the user equipment as second-type radio bearers, identity information of the radio bearer, a first radio bearer release list, and a second radio bearer establishment and modification list are acquired, the identity information is added to the first radio bearer release list and the second radio bearer establishment and modification list, and a first message that includes the first radio bearer release list and the second radio bearer establishment and modification list is generated.

Optionally, when the determining unit determines that the configuration type is re-establishing all established radio bearers corresponding to the user equipment as second-type radio bearers, identity information of the radio bearer, a second radio bearer release list, and a second radio bearer establishment and modification list are acquired, the identity information is added to the second radio bearer release list and the second radio bearer establishment and modification list, and a first message that includes the second radio bearer release list and the second radio bearer establishment and modification list is generated.

Optionally, when the determining unit determines that the configuration type is re-establishing all established radio bearers corresponding to the user equipment as second-type radio bearers, identity information of the radio bearer, identity information of an evolved packet system bearer corresponding to the identity information of the radio bearer, a first radio bearer release list, and a second radio bearer establishment and modification list are acquired, the identity information of the radio bearer is added to the first radio bearer release list, the identity information of the evolved packet system bearer is added to the second radio bearer establishment and modification list, and a first message that includes the first radio bearer release list and the second radio bearer establishment and modification list is generated.

Optionally, when the determining unit determines that the configuration type is re-establishing all established radio bearers corresponding to the user equipment as second-type radio bearers, identity information of the radio bearer, identity information of an evolved packet system bearer corresponding to the identity information of the radio bearer, a second radio bearer release list, and a second radio bearer establishment and modification list are acquired, the identity information of the radio bearer is added to the second radio bearer release list, the identity information of the evolved packet system bearer is added to the second radio bearer establishment and modification list, and a first message that includes the second radio bearer release list and the second radio bearer establishment and modification list is generated.

Optionally, when the determining unit determines that the configuration type is re-establishing all established radio bearers corresponding to the user equipment as second-type radio bearers, identity information of an evolved packet system bearer, a first radio bearer release list, and a second radio bearer establishment and modification list are acquired, the identity information of the evolved packet system bearer is added to the first radio bearer release list and the second radio bearer establishment and modification list, and a first message that includes the first radio bearer release list and the second radio bearer establishment and modification list is generated.

Optionally, when the determining unit determines that the configuration type is re-establishing all established radio bearers corresponding to the user equipment as second-type radio bearers, identity information of an evolved packet system bearer, a second radio bearer release list, and a second radio bearer establishment and modification list are acquired, the identity information of the evolved packet system bearer is added to the second radio bearer release list and the second radio bearer establishment and modification list, and a first message that includes the second radio bearer release list and the second radio bearer establishment and modification list is generated.

Optionally, when the determining unit determines that the configuration type is re-establishing all established radio bearers corresponding to the user equipment as second-type radio bearers, identity information of the radio bearer, a secondary cell group release identity, and a second radio bearer establishment and modification list are acquired, the identity information of the radio bearer is added to the second radio bearer establishment and modification list, and a first message that includes the secondary cell group release identity and the second radio bearer establishment and modification list is generated.

Optionally, when the determining unit determines that the configuration type is re-establishing all established radio bearers corresponding to the user equipment as second-type radio bearers, identity information of an evolved packet system bearer, a secondary cell group release identity, and a second radio bearer establishment and modification list are acquired, the identity information of the evolved packet system bearer is added to the second radio bearer establishment and modification list, and a first message that includes the secondary cell group release identity and the second radio bearer establishment and modification list is generated.

Optionally, when the determining unit determines that the configuration type is re-establishing all established radio bearers corresponding to the user equipment as third-type radio bearers, a first message including a third re-establishment identity is generated.

Optionally, when the determining unit determines that the configuration type is re-establishing all established radio bearers corresponding to the user equipment as third-type radio bearers, identity information of the radio bearer, and a third-type radio bearer re-establishment list are acquired, the identity information is added to the third-type radio bearer re-establishment list, and a first message including the third-type radio bearer re-establishment list is generated.

Optionally, when the determining unit determines that the configuration type is re-establishing all established radio bearers corresponding to the user equipment as third-type radio bearers, identity information of the radio bearer, a first radio bearer release list, a first radio bearer establishment and modification list, and a second radio bearer establishment and modification list are acquired, the identity information of the radio bearer is added to the first radio bearer release list, the first radio bearer establishment and modification list, and the second radio bearer establishment and modification list, and a first message that includes the first radio bearer release list, the first radio bearer establishment and modification list, and the second radio bearer establishment and modification list is generated.

Optionally, when the determining unit determines that the configuration type is re-establishing all established radio bearers corresponding to the user equipment as third-type radio bearers, identity information of the radio bearer, a first radio bearer release list, a second radio bearer release list, a first radio bearer establishment and modification list, and a second radio bearer establishment and modification list are acquired, the identity information of the radio bearer is added to the first radio bearer release list, the second radio bearer release list, the first radio bearer establishment and modification list, and the second radio bearer establishment and modification list, and a first message that includes the first radio bearer release list, the second radio bearer release list, the first radio bearer establishment and modification list, and the second radio bearer establishment and modification list is generated.

Optionally, when the determining unit determines that the configuration type is re-establishing all established radio bearers corresponding to the user equipment as third-type radio bearers, first identity information of the radio bearer, second identity information of the radio bearer, identity information of an evolved packet system bearer corresponding to the first identity information of the radio bearer, a first radio bearer release list, a first radio bearer establishment and modification list, and a second radio bearer establishment and modification list are acquired, the first identity information of the radio bearer is added to the first radio bearer release list, the first identity information of the radio bearer, the second identity information of the radio bearer, and the identity information of the evolved packet system bearer are added to the first radio bearer establishment and modification list, the second identity information of the radio bearer is added to the second radio bearer establishment and modification list, and a first message that includes the first radio bearer release list, the first radio bearer establishment and modification list, and the second radio bearer establishment and modification list is generated.

Optionally, when the determining unit determines that the configuration type is re-establishing all established radio bearers corresponding to the user equipment as third-type radio bearers, first identity information of the radio bearer, second identity information of the radio bearer, identity information of an evolved packet system bearer corresponding to the first identity information of the radio bearer, a first radio bearer release list, a second radio bearer release list, a first radio bearer establishment and modification list, and a second radio bearer establishment and modification list are acquired, the first identity information of the radio bearer is added to the first radio bearer release list and the second radio bearer release list, the second identity information of the radio bearer and the identity information of the evolved packet system bearer are added to the first radio bearer establishment and modification list, the second identity information of the radio bearer is added to the second radio bearer establishment and modification list, and a first message that includes the first radio bearer release list, the second radio bearer release list, the first radio bearer establishment and modification list, and the second radio bearer establishment and modification list is generated.

Optionally, when the determining unit determines that the configuration type is re-establishing all established radio bearers corresponding to the user equipment as third-type radio bearers, identity information of an evolved packet system bearer, identity information of a radio bearer corresponding to the evolved packet system bearer, a first radio bearer release list, a first radio bearer establishment and modification list, and a second radio bearer establishment and modification list are acquired, the identity information of the evolved packet system bearer is added to the first radio bearer release list, the identity information of the evolved packet system bearer and the identity information of the radio bearer are added to the first radio bearer establishment and modification list, the identity information of the radio bearer is added to the second radio bearer establishment and modification list, and a first message that includes the first radio bearer release list, the first radio bearer establishment and modification list, and the second radio bearer establishment and modification list is generated.

Optionally, when the determining unit determines that the configuration type is re-establishing all established radio bearers corresponding to the user equipment as third-type radio bearers, identity information of an evolved packet system bearer, identity information of a radio bearer corresponding to the evolved packet system bearer, a first radio bearer release list, a second radio bearer release list, a first radio bearer establishment and modification list, and a second radio bearer establishment and modification list are acquired, the identity information of the evolved packet system bearer is added to the first radio bearer release list and the second radio bearer release list, the identity information of the evolved packet system bearer and the identity information of the radio bearer are added to the first radio bearer establishment and modification list, the identity information of the radio bearer is added to the second radio bearer establishment and modification list, and a first message that includes the first radio bearer release list, the second radio bearer release list, the first radio bearer establishment and modification list, and the second radio bearer establishment and modification list is generated.

Optionally, when the determining unit determines that the configuration type is re-establishing all established radio bearers corresponding to the user equipment as third-type radio bearers, identity information of the radio bearer, a master cell group release identity, a first radio bearer establishment and modification list, and a second radio bearer establishment and modification list are acquired, the identity information of the radio bearer is added to the first radio bearer establishment and modification list and the second radio bearer establishment and modification list, and a first message that includes the master cell group release identity, the first radio bearer establishment and modification list, and the second radio bearer establishment and modification list is generated.

Optionally, when the determining unit determines that the configuration type is re-establishing all established radio bearers corresponding to the user equipment as third-type radio bearers, identity information of the radio bearer, a secondary cell group release identity, a first radio bearer establishment and modification list, and a second radio bearer establishment and modification list are acquired, the identity information of the radio bearer is added to the first radio bearer establishment and modification list and the second radio bearer establishment and modification list, and a first message that includes the secondary cell group release identity, the first radio bearer establishment and modification list, and the second radio bearer establishment and modification list is generated.

Optionally, when the determining unit determines that the configuration type is re-establishing all established radio bearers corresponding to the user equipment as third-type radio bearers, identity information of an evolved packet system bearer, identity information of a radio bearer corresponding to the identity information of the evolved packet system bearer, a master cell group release identity, a first radio bearer establishment and modification list, and a second radio bearer establishment and modification list are acquired, the identity information of the evolved packet system bearer and the identity information of the radio bearer are added to the first radio bearer establishment and modification list, the identity information of the radio bearer is added to the second radio bearer establishment and modification list, and a first message that includes the master cell group release identity, the first radio bearer establishment and modification list, and the second radio bearer establishment and modification list is generated.

Optionally, when the determining unit determines that the configuration type is re-establishing all established radio bearers corresponding to the user equipment as third-type radio bearers, identity information of an evolved packet system bearer, identity information of a radio bearer corresponding to the identity information of the evolved packet system bearer, a secondary cell group release identity, a first radio bearer establishment and modification list, and a second radio bearer establishment and modification list are acquired, the identity information of the evolved packet system bearer and the identity information of the radio bearer are added to the first radio bearer establishment and modification list, the identity information of the radio bearer is added to the second radio bearer establishment and modification list, and a first message that includes the secondary cell group release identity, the first radio bearer establishment and modification list, and the second radio bearer establishment and modification list is generated.

Optionally, when the determining unit determines that the configuration type is establishing or reconfiguring the MAC entity corresponding to the secondary cell group, an identity of the secondary cell group and a secondary cell group establishment and modification list are acquired, the identity of the secondary cell group is added to the secondary cell group establishment and modification list, and a first message including the secondary cell group establishment and modification list is generated.

Optionally, when the determining unit determines that the configuration type is establishing or reconfiguring the MAC entity corresponding to the secondary cell group, a secondary cell group establishment and modification identity is acquired, and a first message including the secondary cell group establishment and modification identity is generated.

Optionally, when the determining unit determines that the configuration type is establishing or reconfiguring the MAC entity corresponding to the secondary cell group, a secondary MAC configuration identity is acquired, and a first message including the secondary MAC configuration identity is generated.

Optionally, when the determining unit determines that the configuration type is releasing the MAC entity corresponding to the secondary cell group, an identity of the secondary cell group and a secondary cell group release list are acquired, the identity of the secondary cell group is added to the secondary cell group release list, and a first message including the secondary cell group release list is generated.

Optionally, when the determining unit determines that the configuration type is releasing the MAC entity corresponding to the secondary cell group, a secondary cell group release identity is acquired, and a first message including the secondary cell group release identity is generated.

Optionally, when the determining unit determines that the configuration type is releasing the MAC entity corresponding to the secondary cell group, a secondary MAC release identity is acquired, and a first message including the secondary MAC release identity is generated.

Optionally, when the determining unit determines that the configuration type is resetting the MAC entity corresponding to the secondary cell group, an identity of the secondary cell group, a secondary cell group establishment and modification list, and a secondary cell group release list are acquired, the identity of the secondary cell group is added to the secondary cell group establishment and modification list and the secondary cell group release list, and a first message that includes the secondary cell group establishment and modification list and the secondary cell group release list is generated.

Optionally, when the determining unit determines that the configuration type is resetting the MAC entity corresponding to the secondary cell group, a secondary cell group establishment and modification identity and a secondary cell group release identity are acquired, and a first message that includes the secondary cell group establishment and modification identity and the secondary cell group release identity is generated.

Optionally, when the determining unit determines that the configuration type is resetting the MAC entity corresponding to the secondary cell group, a secondary MAC configuration identity and a secondary cell group release identity are acquired, and a first message that includes the secondary MAC configuration identity and the secondary cell group release identity is generated.

Optionally, when the determining unit determines that the configuration type is resetting the MAC entity corresponding to the secondary cell group, a secondary MAC configuration identity and a secondary MAC release identity are acquired, and a first message that includes the secondary MAC configuration identity and the secondary MAC release identity is generated.

Optionally, when the determining unit determines that the configuration type is resetting the MAC entity corresponding to the secondary cell group, a secondary cell group reset identity is acquired, and a first message including the secondary cell group reset identity is generated.

Optionally, when the determining unit determines that the configuration type is resetting the MAC entity corresponding to the secondary cell group, a secondary MAC reset identity is acquired, and a first message including the secondary MAC reset identity is generated.

S303: The network device sends the first message to user equipment.

Specifically, after generating the first message, the network device sends the first message to the user equipment, so that the user equipment determines the configuration type according to the first message, and configures the radio bearer or the MAC entity according to the configuration type.

By using the foregoing method executed by a network device, the network device determines a configuration type, generates a first message according to the configuration type, and sends the first message to user equipment. In this way, the user equipment can correctly configure different types of radio bearers and correctly configure a MAC entity according to a first message sent by a base station.

Figure 4:
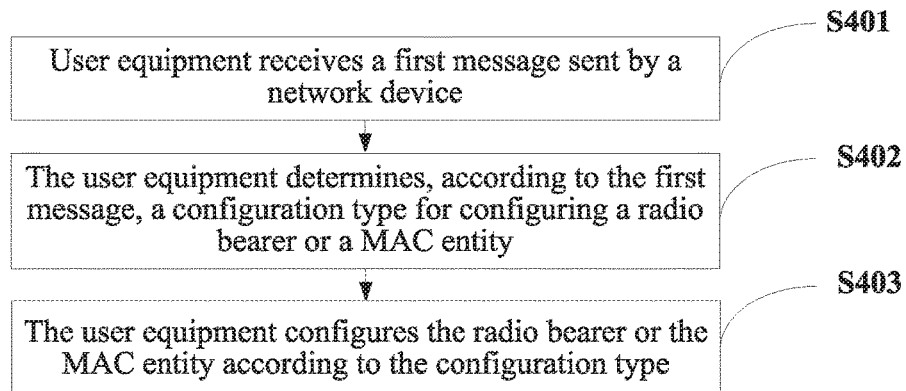
FIG. 4 is a schematic flowchart of another configuration method according to an embodiment.

An embodiment provides a configuration method. As shown in FIG. 4, the method is executed by user equipment, and the method includes.

S401: The user equipment receives a first message sent by a network device.

The base station includes a master base station corresponding to the user equipment, and the first message is used for instructing the user equipment to configure a radio bearer or configure a MAC entity corresponding to a secondary cell group.

Specifically, the base station may be the master base station corresponding to the user equipment, and the first message may be a radio resource control message. The master base station sends the radio resource control message to the user equipment, so as to instruct the user equipment to configure, according to the radio resource control message, the radio bearer or configure, according to the radio resource control message, the MAC (Medium Access Control) entity corresponding to the secondary cell group.

There are three types of radio bearers, which are separately used for communicating with the master base station and a secondary base station that correspond to the user equipment.

Specifically, the user equipment communicates with the master base station by using a master cell group radio bearer, communicates with the secondary base station by using a secondary cell group radio bearer, and simultaneously communicates with the master base station and the secondary base station by using an offload radio bearer.

Specifically, the user equipment communicates with the master base station by using a MAC entity corresponding to a master cell group, and communicates with the secondary base station by using the MAC entity corresponding to the secondary cell group.

The user equipment saves current configuration, where the current configuration is used for configuring the radio bearer or the MAC entity corresponding to the secondary cell group.

The master cell group radio bearer is associated with one PDCP (Packet Date Convergence Protocol) entity, one RLC (Radio Link Control) entity, and one LCH (Logical Channel) in the MAC entity corresponding to the master cell group; the secondary cell group radio bearer is associated with one PDCP entity, one RLC entity, and one LCH in a secondary MAC entity, that is, the MAC entity corresponding to the secondary cell group; the offload radio bearer is associated with one PDCP entity, two RLC entities, and two LCHs, where one of the two LCHs is an LCH in a master MAC entity, that is, the MAC entity corresponding to the master cell group, and the other is an LCH in the MAC entity corresponding to the secondary MAC entity, that is, the MAC entity corresponding to the secondary cell group.

S402: The user equipment determines, according to the first message, a configuration type for configuring a radio bearer or a MAC entity.

The configuration type refers to an operation that the user equipment needs to perform on the radio bearer or on the MAC entity corresponding to the secondary cell group.

Optionally, if the first message received by the receiving unit includes a first radio bearer establishment and modification list, the first radio bearer establishment and modification list includes identity information of the radio bearer, and the identity information of the radio bearer is not in current configuration of the user equipment, determining that the configuration type is establishing a first-type radio bearer.

Optionally, if the first message includes a first radio bearer establishment and modification list, the first radio bearer establishment and modification list includes identity information of the radio bearer, and the identity information of the radio bearer is not in current configuration of the user equipment, determining that the configuration type is establishing a first-type radio bearer.

Optionally, if the first message includes a second radio bearer establishment and modification list, the second radio bearer establishment and modification list includes identity information of the radio bearer, and the identity information of the radio bearer is not in current configuration of the user equipment, determining that the configuration type is establishing a second-type radio bearer.

Optionally, if the first message includes a first radio bearer establishment and modification list and a second radio bearer establishment and modification list, the first radio bearer establishment and modification list includes identity information of the radio bearer, the second radio bearer establishment and modification list includes the identity information of the radio bearer, and the identity information of the radio bearer is not in current configuration of the user equipment, determining that the configuration type is establishing a third-type radio bearer.

Optionally, if the first message includes a first radio bearer establishment and modification list, the first radio bearer establishment and modification list includes identity information of the radio bearer, and the identity information of the radio bearer is in current configuration of the user equipment, determining that the configuration type is reconfiguring the radio bearer.

Optionally, if the first message includes a second radio bearer establishment and modification list, the second radio bearer establishment and modification list includes identity information of the radio bearer, and the identity information of the radio bearer is in current configuration of the user equipment, determining that the configuration type is reconfiguring the radio bearer.

Optionally, if the first message includes a first radio bearer establishment and modification list and a second radio bearer establishment and modification list, the first radio bearer establishment and modification list includes identity information of the radio bearer, the second radio bearer establishment and modification list includes the identity information of the radio bearer, and the identity information of the radio bearer is in current configuration of the user equipment, determining that the configuration type is reconfiguring the radio bearer.

Optionally, if the first message includes a first radio bearer release list, the first radio bearer release list includes identity information of the radio bearer, and the identity information of the radio bearer is in current configuration of the user equipment, determining that the configuration type is releasing the radio bearer.

Optionally, if the first message includes a second radio bearer release list, the second radio bearer release list includes identity information of the radio bearer, and the identity information of the radio bearer is in current configuration of the user equipment, determining that the configuration type is releasing the radio bearer.

Optionally, if the first message includes a first radio bearer release list and a second radio bearer release list, the first radio bearer release list and the second radio bearer release list both include identity information of the radio bearer, and the identity information of the radio bearer is in current configuration of the user equipment, determining that the configuration type is releasing the radio bearer.

Optionally, if the first message includes a first re-establishment identity, determining that the configuration type is re-establishing all radio bearers as first-type radio bearers.

Optionally, if the first message includes a second re-establishment identity, determining that the configuration type is re-establishing all radio bearers as second-type radio bearers.

Optionally, if the first message includes a third re-establishment identity, determining that the configuration type is re-establishing all radio bearers as third-type radio bearers.

Optionally, if the first message includes a first-type radio bearer re-establishment list, the first-type radio bearer re-establishment list includes identity information of the radio bearer, and the identity information of the radio bearer is in current configuration of the user equipment, determining that the configuration type is re-establishing the radio bearer as a first-type radio bearer.

Optionally, if the first message includes a second-type radio bearer re-establishment list, the second-type radio bearer re-establishment list includes identity information of the radio bearer, and the identity information of the radio bearer is in current configuration of the user equipment, determining that the configuration type is re-establishing the radio bearer as a second-type radio bearer.

Optionally, if the first message includes a third-type radio bearer re-establishment list, the third-type radio bearer re-establishment list includes identity information of the radio bearer, and the identity information of the radio bearer is in current configuration of the user equipment, determining that the configuration type is re-establishing the radio bearer as a third-type radio bearer.

Optionally, if the first message includes a first radio bearer release list and a first radio bearer establishment and modification list, the first radio bearer release list and the first radio bearer establishment and modification list both include identity information of the radio bearer, and the identity information of the radio bearer is in current configuration of the user equipment, determining that the configuration type is re-establishing the radio bearer as a first-type radio bearer.

Optionally, if the first message includes a first radio bearer release list and a second radio bearer establishment and modification list, the first radio bearer release list and the second radio bearer establishment and modification list both include identity information of the radio bearer, and the identity information of the radio bearer is in current configuration of the user equipment, determining that the configuration type is re-establishing the radio bearer as a second-type radio bearer.

Optionally, if the first message includes a second radio bearer release list and a second radio bearer establishment and modification list, the second radio bearer release list and the second radio bearer establishment and modification list both include identity information of the radio bearer, and the identity information of the radio bearer is in current configuration of the user equipment, determining that the configuration type is re-establishing the radio bearer as a second-type radio bearer.

Optionally, if the first message includes a first radio bearer release list, a first radio bearer establishment and modification list, and a second radio bearer establishment and modification list, the first radio bearer release list, the first radio bearer establishment and modification list, and the second radio bearer establishment and modification list all include identity information of the radio bearer, and the identity information of the radio bearer is in current configuration of the user equipment, determining that the configuration type is re-establishing the radio bearer as a third-type radio bearer.

Optionally, if the first message includes a first radio bearer release list, a second radio bearer release list, a first radio bearer establishment and modification list, and a second radio bearer establishment and modification list, the first radio bearer release list, the second radio bearer release list, the first radio bearer establishment and modification list, and the second radio bearer establishment and modification list all include identity information of the radio bearer, and the identity information of the radio bearer is in current configuration of the user equipment, determining that the configuration type is re-establishing the radio bearer as a third-type radio bearer.

Optionally, if the first message includes a first radio bearer release list and a first radio bearer establishment and modification list, the first radio bearer release list includes identity information of the radio bearer, the first radio bearer establishment and modification list includes identity information of an evolved packet system bearer corresponding to the identity information of the radio bearer, and the identity information of the radio bearer is in current configuration of the user equipment, determining that the configuration type is re-establishing the radio bearer as a first-type radio bearer.

Optionally, if the first message includes a first radio bearer release list and a second radio bearer establishment and modification list, the first radio bearer release list includes identity information of the radio bearer, the second radio bearer establishment and modification list includes identity information of an evolved packet system bearer corresponding to the identity information of the radio bearer, and the identity information of the radio bearer is in current configuration of the user equipment, determining that the configuration type is re-establishing the radio bearer as a second-type radio bearer.

Optionally, if the first message includes a second radio bearer release list and a second radio bearer establishment and modification list, the second radio bearer release list includes identity information of the radio bearer, the second radio bearer establishment and modification list includes identity information of an evolved packet system bearer corresponding to the identity information of the radio bearer, and the identity information of the radio bearer is in current configuration of the user equipment, determining that the configuration type is re-establishing the radio bearer as a second-type radio bearer.

Optionally, if the first message includes a first radio bearer release list, a first radio bearer establishment and modification list, and a second radio bearer establishment and modification list, the first radio bearer release list includes first identity information of the radio bearer, the first radio bearer establishment and modification list includes identity information of an evolved packet system bearer corresponding to the first identity information of the radio bearer and includes second identity information of the radio bearer, the second radio bearer establishment and modification list includes the second identity information of the radio bearer, and the first identity information of the radio bearer is in current configuration of the user equipment, determining that the configuration type is re-establishing the radio bearer as a third-type radio bearer.

Optionally, if the first message includes a first radio bearer release list, a second radio bearer release list, a first radio bearer establishment and modification list, and a second radio bearer establishment and modification list, the first radio bearer release list and the second radio bearer release list both include first identity information of the radio bearer, the first radio bearer establishment and modification list includes identity information of an evolved packet system bearer corresponding to the first identity information of the radio bearer and includes second identity information of the radio bearer, the second radio bearer establishment and modification list includes the second identity information of the radio bearer, and the first identity information of the radio bearer is in current configuration of the user equipment, determining that the configuration type is re-establishing the radio bearer as a third-type radio bearer.

Optionally, if the first message includes a first radio bearer release list and a first radio bearer establishment and modification list, the first radio bearer release list includes identity information of an evolved packet system bearer, the first radio bearer establishment and modification list includes the identity information of the evolved packet system bearer, and the identity information of the evolved packet system bearer is in current configuration of the user equipment, determining that the configuration type is re-establishing a radio bearer corresponding to the evolved packet system bearer as a first-type radio bearer.

Optionally, if the first message includes a first radio bearer release list and a second radio bearer establishment and modification list, the first radio bearer release list includes identity information of an evolved packet system bearer, the second radio bearer establishment and modification list includes the identity information of the evolved packet system bearer, and the identity information of the evolved packet system bearer is in current configuration of the user equipment, determining that the configuration type is re-establishing a radio bearer corresponding to the evolved packet system bearer as a second-type radio bearer.

Optionally, if the first message includes a second radio bearer release list and a second radio bearer establishment and modification list, the second radio bearer release list includes identity information of an evolved packet system bearer, the second radio bearer establishment and modification list includes the identity information of the evolved packet system bearer, and the identity information of the evolved packet system bearer is in current configuration of the user equipment, determining that the configuration type is re-establishing a radio bearer corresponding to the evolved packet system bearer as a second-type radio bearer.

Optionally, if the first message includes a first radio bearer release list, a first radio bearer establishment and modification list, and a second radio bearer establishment and modification list, the first radio bearer release list includes identity information of an evolved packet system bearer, the first radio bearer establishment and modification list includes the identity information of the evolved packet system bearer and includes identity information of a radio bearer corresponding to the evolved packet system bearer, the second radio bearer establishment and modification list includes the identity information of the radio bearer, and the identity information of the evolved packet system bearer is in current configuration of the user equipment, determining that the configuration type is re-establishing the radio bearer as a third-type radio bearer.

Optionally, if the first message includes a first radio bearer release list, a second radio bearer release list, a first radio bearer establishment and modification list, and a second radio bearer establishment and modification list, the first radio bearer release list and the second radio bearer release list both include identity information of an evolved packet system bearer, the first radio bearer establishment and modification list includes the identity information of the evolved packet system bearer and includes identity information of a radio bearer corresponding to the evolved packet system bearer, the second radio bearer establishment and modification list includes the identity information of the radio bearer, and the identity information of the evolved packet system bearer is in current configuration of the user equipment, determining that the configuration type is re-establishing the radio bearer corresponding to the evolved packet system bearer as a third-type radio bearer.

Optionally, if the first message includes a master cell group release identity and a first radio bearer establishment and modification list, the first radio bearer establishment and modification list includes identity information of the radio bearer, and the identity information of the radio bearer is in current configuration of the user equipment, determining that the configuration type is re-establishing the radio bearer as a first-type radio bearer.

Optionally, if the first message includes a secondary cell group release identity and a second radio bearer establishment and modification list, the second radio bearer establishment and modification list includes identity information of the radio bearer, and the identity information of the radio bearer is in current configuration of the user equipment, determining that the configuration type is re-establishing the radio bearer as a second-type radio bearer.

Optionally, if the first message includes a master cell group release identity, a first radio bearer establishment and modification list, and a second radio bearer establishment and modification list, the first radio bearer establishment and modification list and the second radio bearer establishment and modification list both include identity information of the radio bearer, and the identity information of the radio bearer is in current configuration of the user equipment, determining that the configuration type is re-establishing the radio bearer as a third-type radio bearer.

Optionally, if the first message includes a secondary cell group release identity, a first radio bearer establishment and modification list, and a second radio bearer establishment and modification list, the first radio bearer establishment and modification list and the second radio bearer establishment and modification list both include identity information of the radio bearer, and the identity information of the radio bearer is in current configuration of the user equipment, determining that the configuration type is re-establishing the radio bearer as a third-type radio bearer.

Optionally, if the first message includes a master cell group release identity and a first radio bearer establishment and modification list, the first radio bearer establishment and modification list includes identity information of an evolved packet system bearer, and the identity information of the evolved packet system bearer is in current configuration of the user equipment, determining that the configuration type is re-establishing a radio bearer corresponding to the evolved packet system bearer as a first-type radio bearer.

Optionally, if the first message includes a secondary cell group release identity and a second radio bearer establishment and modification list, the second radio bearer establishment and modification list includes identity information of an evolved packet system bearer, and the identity information of the evolved packet system bearer is in current configuration of the user equipment, determining that the configuration type is re-establishing a radio bearer corresponding to the evolved packet system bearer as a second-type radio bearer.

Optionally, if the first message includes a master cell group release identity, a first radio bearer establishment and modification list, and a second radio bearer establishment and modification list, the first radio bearer establishment and modification list includes identity information of an evolved packet system bearer and includes identity information of a radio bearer corresponding to the identity information of the evolved packet system bearer, the second radio bearer establishment and modification list includes the identity information of the radio bearer, and the identity information of the evolved packet system bearer is in current configuration of the user equipment, determining that the configuration type is re-establishing a radio bearer corresponding to the evolved packet system bearer as a third-type radio bearer.

Optionally, if the first message includes a secondary cell group release identity, a first radio bearer establishment and modification list, and a second radio bearer establishment and modification list, the first radio bearer establishment and modification list includes identity information of an evolved packet system bearer and includes identity information of a radio bearer corresponding to the identity information of the evolved packet system bearer, the second radio bearer establishment and modification list includes the identity information of the radio bearer, and the identity information of the evolved packet system bearer is in current configuration of the user equipment, determining that the configuration type is re-establishing the radio bearer corresponding to the evolved packet system bearer as a third-type radio bearer.

Optionally, if the first message includes a secondary cell group establishment and modification list, the secondary cell group establishment and modification list includes an identity of the secondary cell group, and the identity of the secondary cell group is not in current configuration of the user equipment, determining that the configuration type is establishing the MAC entity corresponding to the secondary cell group.

Optionally, if the first message includes a secondary cell group establishment and modification list, the secondary cell group establishment and modification list includes an identity of the secondary cell group, and the identity of the secondary cell group is in current configuration of the user equipment, determining that the configuration type is reconfiguring the MAC entity corresponding to the secondary cell group.

Optionally, if the first message includes a secondary cell group release list, the secondary cell group release list includes an identity of the secondary cell group, and the identity of the secondary cell group is in current configuration of the user equipment, determining that the configuration type is releasing the MAC entity corresponding to the secondary cell group.

Optionally, if the first message includes a secondary cell group establishment and modification list and a secondary cell group release list, the secondary cell group establishment and modification list and the secondary cell group release list both include an identity of the secondary cell group, and the identity of the secondary cell group is in current configuration of the user equipment, determining that the configuration type is resetting the MAC entity corresponding to the secondary cell group.

Optionally, if the first message includes a secondary cell group establishment and modification identity or a secondary MAC configuration identity, and the MAC entity corresponding to the secondary cell group is not established, determining that the configuration type is establishing the MAC entity.

Optionally, if the first message includes a secondary cell group establishment and modification identity or a secondary MAC configuration identity, and the MAC entity corresponding to the secondary cell group is already established, determining that the configuration type is reconfiguring the MAC entity.

Optionally, if the first message includes a secondary cell group release identity or a secondary MAC release identity, and the MAC entity corresponding to the secondary cell group is already established, determining that the configuration type is releasing the MAC entity.

Optionally, if the first message includes a secondary cell group establishment and modification identity and a secondary cell group release identity, and the MAC entity corresponding to the secondary cell group is already established, determining that the configuration type is resetting the MAC entity.

Optionally, if the first message includes a secondary MAC configuration identity and a secondary cell group release identity, and the MAC entity corresponding to the secondary cell group is already established, determining that the configuration type is resetting the MAC entity.

Optionally, if the first message includes a secondary MAC configuration identity and a secondary MAC release identity, and the MAC entity corresponding to the secondary cell group is already established, determining that the configuration type is resetting the MAC entity.

Optionally, if the first message includes a secondary cell group reset identity or a secondary MAC reset identity, and the MAC entity corresponding to the secondary cell group is already established, determining that the configuration type is resetting the MAC entity.

S403: The user equipment configures the radio bearer or the MAC entity according to the configuration type.

The first-type radio bearer may be a master cell group radio bearer, the second-type radio bearer may be a secondary cell group radio bearer, and the third-type radio bearer may be an offload radio bearer.

Specifically, after determining the configuration type, the user equipment configures, according to the configuration type, the radio bearer or configures, according to the configuration type, the MAC entity corresponding to the secondary cell group, and sends a message to a non-access stratum to indicate that configuration of the radio bearer is completed, so as to notify a network that the user equipment completes a corresponding configuration operation.

When determining to establish a master cell group radio bearer, the user equipment establishes a PDCP-1, establishes an RLC-1 and an LCH-M, and indicates to the non-access stratum that the radio bearer is established, where the LCH-M is an LCH in the MAC entity corresponding to the master cell group.

When determining to establish a secondary cell group radio bearer, the user equipment establishes a PDCP-1, establishes an RLC-1 and an LCH-S, and indicates to the non-access stratum that the radio bearer is established, where the LCH-S is an LCH in the MAC entity corresponding to the secondary cell group.

When determining to establish an offload radio bearer, the user equipment establishes a PDCP-1, establishes an RLC-1 and an RLC-2, establishes an LCH-M and an LCH-S, and indicates to the non-access stratum that the radio bearer is established.

Optionally, when determining to reconfigure the master cell group radio bearer, the user equipment reconfigures the PDCP-1, the RLC-1, or the LCH-M.

Optionally, when determining to reconfigure the secondary cell group radio bearer, the user equipment reconfigures the PDCP-1, the RLC-1, or the LCH-S.

Optionally, when determining to reconfigure the offload radio bearer, the user equipment reconfigures the PDCP-1, the RLC-1, the RLC-2, the LCH-M, or the LCH-S.

Optionally, when determining to release the master cell group radio bearer, the user equipment releases the PDCP-1, the RLC-1, and the LCH-M, and indicates to the non-access stratum that the radio bearer is released.

Optionally, when determining to release the secondary cell group radio bearer, the user equipment releases the PDCP-1, the RLC-1, and the LCH-S, and indicates to the non-access stratum that the radio bearer is released.

Optionally, when determining to release the offload radio bearer, the user equipment releases the PDCP-1, releases the RLC-1 and the RLC-2, releases the LCH-M and the LCH-S, and indicates to the non-access stratum that the radio bearer is released.

Optionally, when determining to re-establish the master cell group radio bearer as a master cell group radio bearer, the user equipment re-establishes the PDCP-1 and the RLC-1; when determining to re-establish the secondary cell group radio bearer as a master cell group radio bearer, the user equipment re-establishes the PDCP-1 and the RLC-1, establishes the LCH-M, and releases the LCH-S; or when determining to re-establish the offload radio bearer as a master cell group radio bearer, the user equipment may re-establish the PDCP-1, the RLC-1 and the RLC-2, and release the RLC-2 and the LCH-S.

It should be noted that, the user equipment re-establishes the RLC-2, so that the RLC entity transfers received data to the PDCP; after the data is transferred to the PDCP, the RLC-2 is ineffective, and the user equipment releases the RLC-2.

Optionally, when determining to re-establish the master cell group radio bearer as a secondary cell group radio bearer, the user equipment re-establishes the PDCP-1 and the RLC-1, establishes the LCH-S, and releases the LCH-M; when determining to re-establish the secondary cell group radio bearer as a secondary cell group radio bearer, the user equipment re-establishes the PDCP-1 and the RLC-1; or when determining to re-establish the offload radio bearer as a secondary cell group radio bearer, the user equipment re-establishes the PDCP-1 and the RLC-2, and the user equipment may re-establish the RLC-1, and release the RLC-1 and the LCH-M.

Optionally, when determining to re-establish the master cell group radio bearer as an offload radio bearer, the user equipment establishes the RLC-2 and the LCH-S; when determining to re-establish the secondary cell group radio bearer as an offload radio bearer, the user equipment re-establishes the PDCP-1 and the RLC-1, and establishes the RLC-2 and the LCH-M; or when determining to re-establish the offload radio bearer as an offload radio bearer, the user equipment may re-establish the PDCP-1, the RLC-1, and the RLC-2.

It should be noted that, in the process of the foregoing operations, the user equipment may send a PDCP status report to the network device, or, the user equipment may reconfigure the PDCP-1, the RLC, the RLC-2, the LCH-M, or the LCH-S, which is not limited in this embodiment.

It should be noted that, in the process of the foregoing operations, a process of re-establishing (re-establish) the radio bearer as the master cell group radio bearer may also be referred to as a process of switching the radio bearer to the master cell group radio bearer, where the process may be used for switching one secondary cell group bearer or one offload radio bearer to one master cell group bearer, or may be used for associating one master cell group bearer with a new master cell group. As long as the foregoing objective is achieved, specific steps of the process are not limited to specific steps given in this embodiment.

It should be noted that, in the process of the foregoing operations, a process of re-establishing (re-establish) the radio bearer as the secondary cell group radio bearer may also be referred to as a process of switching the radio bearer to the secondary cell group radio bearer, where the process may be used for switching one master cell group bearer or one offload radio bearer to one secondary cell group bearer, or may be used for associating one secondary cell group bearer with a new secondary cell group. As long as the foregoing objective is achieved, specific steps of the process are not limited to specific steps given in this embodiment.

It should be noted that, in the process of the foregoing operations, a process of re-establishing (re-establish) the radio bearer as the offload radio bearer may also be referred to as a process of switching (switch) the radio bearer to the offload radio bearer, where the process may be used for switching one master cell group bearer or one secondary cell group bearer to one offload radio bearer, or may be used for associating one offload radio bearer with a new master cell group or a new secondary cell group. As long as the foregoing objective is achieved, specific steps of the process are not limited to specific steps given in this embodiment.

Optionally, the user equipment may perform an operation, according to the configuration type, on the MAC entity corresponding to the secondary cell group.

Specifically, if the radio resource control message includes a secondary cell group establishment and modification list, when determining that the secondary cell group establishment and modification list includes an evolved packet system identity corresponding to the radio bearer, if current configuration of the user equipment does not include the evolved packet system identity, determining to establish a MAC entity corresponding to the evolved packet system identity.

If the radio resource control message includes a secondary cell group establishment and modification list, when determining that the secondary cell group establishment and modification list includes an evolved packet system identity corresponding to the radio bearer, if current configuration of the user equipment includes the evolved packet system identity, determining to reconfigure a MAC entity corresponding to the evolved packet system identity.

If the radio resource control message includes a secondary cell group release list, when determining that the secondary cell group release list includes an evolved packet system identity corresponding to the radio bearer, if current configuration of the user equipment includes the evolved packet system identity, determining to release a MAC entity corresponding to the evolved packet system identity.

If the radio resource control message includes a secondary cell group establishment and modification list and a secondary cell group release list, when determining that the secondary cell group establishment and modification list and the secondary cell group release list both include an evolved packet system identity corresponding to the radio bearer, determining to re-establish a MAC entity corresponding to the evolved packet system identity.

Optionally, when determining that the radio resource control message includes a secondary cell group establishment and modification identity, if determining that a MAC entity does not exist, the user equipment determines to establish the MAC entity.

When determining that the radio resource control message includes a secondary cell group establishment and modification identity, if determining that a MAC entity exists, the user equipment determines to reconfigure the MAC entity.

When determining that the radio resource control message includes a secondary cell group release identity, the user equipment determines to release the MAC entity.

When determining that the radio resource control message includes a secondary cell group re-establishment identity, the user equipment determines to re-establish the MAC entity.

By using the foregoing solution, user equipment receives a first message sent by a network device, determines a configuration type according to the first message, and configures, according to the configuration type, a first-type radio bearer, a second-type radio bearer, and a third-type radio bearer, or configures, according to the configuration type, a MAC entity corresponding to a secondary cell group. In this way, the user equipment can correctly configure different types of radio bearers and correctly configure the MAC entity according to a radio resource control message sent by a base station.

It should be noted that, for brief description, the foregoing method embodiments are described as a combination of a series of actions. However, a person skilled in the art should know that the embodiments are not limited to the described sequence of actions. Second, a person skilled in the art should know that the embodiments described in this specification all belong to exemplary embodiments and the involved actions and modules are not necessary for the embodiments.

An embodiment provides network device 50. As shown in FIG. 5, the network device 50 includes: a processor 51, a communications interface 52, a memory 53, and a communications bus 54, where the processor 51, the communications interface 52, and the memory 53 communicate with each other by using the communications bus 54.

The processor 51 may be a central processing unit (CPU), or an application specific integrated circuit ASIC (Application Specific Integrated Circuit), or one or more integrated circuits configured to implement the embodiments.

The memory 53 is configured to store executable program code, where the program code includes a computer executable instruction. The memory 53 may include a high-speed random access memory (RAM) memory, and may further include a non-volatile memory, for example, at least one magnetic disk memory.

The communications interface 52 is configured to implement connection communication between apparatuses.

The processor 51 executes the program code, to determine a configuration type, generate a first message according to the configuration type, and send the first message to user equipment.

The configuration type refers to an operation that the user equipment needs to perform on a radio bearer or on a MAC entity corresponding to a secondary cell group, and the first message is used for instructing the user equipment to configure the radio bearer or the MAC entity.

Optionally, the processor 51 is configured to: when determining that the configuration type is establishing or reconfiguring a first-type radio bearer, acquire identity information of the radio bearer and a first radio bearer establishment and modification list, add the identity information to the first radio bearer establishment and modification list, and generate a first message including the first radio bearer establishment and modification list.

Optionally, the processor 51 is configured to: when determining that the configuration type is establishing or reconfiguring a second-type radio bearer, acquire identity information of the radio bearer and a second radio bearer establishment and modification list, add the identity information to the second radio bearer establishment and modification list, and generate a first message including the second radio bearer establishment and modification list.

Optionally, the processor 51 is configured to: when determining that the configuration type is establishing or reconfiguring a third-type radio bearer, acquire identity information of the radio bearer, a first radio bearer establishment and modification list, and a second radio bearer establishment and modification list, add the identity information to the first radio bearer establishment and modification list and the second radio bearer establishment and modification list, and generate a first message that includes the first radio bearer establishment and modification list and the second radio bearer establishment and modification list.

Optionally, the processor 51 is configured to: when determining that the configuration type is releasing the radio bearer, acquire identity information of the radio bearer and a first radio bearer release list, add the identity information to the first radio bearer release list, and generate a first message including the first radio bearer release list.

Optionally, the processor 51 is configured to: when determining that the configuration type is releasing the radio bearer, acquire identity information of the radio bearer and a second radio bearer release list, add the identity information to the second radio bearer release list, and generate a first message including the second radio bearer release list.

Optionally, the processor 51 is configured to: when determining that the configuration type is releasing the radio bearer, acquire identity information of the radio bearer, a first radio bearer release list, and a second radio bearer release list, add the identity information to the first radio bearer release list and the second radio bearer release list, and generate a first message that includes the first radio bearer release list and the second radio bearer release list.

Optionally, the processor 51 is configured to: when determining that the configuration type is re-establishing all established radio bearers corresponding to the user equipment as first-type radio bearers, generate a first message including a first re-establishment identity.

Optionally, the processor 51 is configured to: when determining that the configuration type is re-establishing all established radio bearers corresponding to the user equipment as first-type radio bearers, acquire identity information of the radio bearer and a first-type radio bearer re-establishment list, add the identity information to the first-type radio bearer re-establishment list, and generate a first message including the first-type radio bearer re-establishment list.

Optionally, the processor 51 is configured to: when determining that the configuration type is re-establishing all established radio bearers corresponding to the user equipment as first-type radio bearers, acquire identity information of the radio bearer, a first radio bearer release list, and a first radio bearer establishment and modification list, add the identity information to the first radio bearer release list and the first radio bearer establishment and modification list, and generate a first message that includes the first radio bearer release list and the first radio bearer establishment and modification list.

Optionally, the processor 51 is configured to: when determining that the configuration type is re-establishing all established radio bearers corresponding to the user equipment as first-type radio bearers, acquire identity information of the radio bearer, identity information of an evolved packet system bearer corresponding to the identity information of the radio bearer, a first radio bearer release list, and a first radio bearer establishment and modification list, add the identity information of the radio bearer to the first radio bearer release list, add the identity information of the evolved packet system bearer to the first radio bearer establishment and modification list, and generate a first message that includes the first radio bearer release list and the first radio bearer establishment and modification list.

Optionally, the processor 51 is configured to: when determining that the configuration type is re-establishing all established radio bearers corresponding to the user equipment as first-type radio bearers, acquire identity information of an evolved packet system bearer, a first radio bearer release list, and a first radio bearer establishment and modification list, add the identity information of the evolved packet system bearer to the first radio bearer release list and the first radio bearer establishment and modification list, and generate a first message that includes the first radio bearer release list and the first radio bearer establishment and modification list.

Optionally, the processor 51 is configured to: when determining that the configuration type is re-establishing all established radio bearers corresponding to the user equipment as first-type radio bearers, acquire identity information of the radio bearer, a master cell group release identity, and a first radio bearer establishment and modification list, add the identity information of the radio bearer to the first radio bearer establishment and modification list, and generate a first message that includes the master cell group release identity and the first radio bearer establishment and modification list.

Optionally, the processor 51 is configured to: when determining that the configuration type is re-establishing all established radio bearers corresponding to the user equipment as first-type radio bearers, acquire identity information of an evolved packet system bearer, a master cell group release identity, and a first radio bearer establishment and modification list, add the identity information of the evolved packet system bearer to the first radio bearer establishment and modification list, and generate a first message that includes the master cell group release identity and the first radio bearer establishment and modification list.

Optionally, the processor 51 is configured to: when determining that the configuration type is re-establishing all established radio bearers corresponding to the user equipment as second-type radio bearers, generate a first message including a second re-establishment identity.

Optionally, the processor 51 is configured to: when determining that the configuration type is re-establishing all established radio bearers corresponding to the user equipment as second-type radio bearers, acquire identity information of the radio bearer and a second-type radio bearer re-establishment list, add the identity information to the second-type radio bearer re-establishment list, and generate a first message including the second-type radio bearer re-establishment list.

Optionally, the processor 51 is configured to: when determining that the configuration type is re-establishing all established radio bearers corresponding to the user equipment as second-type radio bearers, acquire identity information of the radio bearer, a first radio bearer release list, and a second radio bearer establishment and modification list, add the identity information to the first radio bearer release list and the second radio bearer establishment and modification list, and generate a first message that includes the first radio bearer release list and the second radio bearer establishment and modification list.

Optionally, the processor 51 is configured to: when determining that the configuration type is re-establishing all established radio bearers corresponding to the user equipment as second-type radio bearers, acquire identity information of the radio bearer, a second radio bearer release list, and a second radio bearer establishment and modification list, add the identity information to the second radio bearer release list and the second radio bearer establishment and modification list, and generate a first message that includes the second radio bearer release list and the second radio bearer establishment and modification list.

Optionally, the processor 51 is configured to: when determining that the configuration type is re-establishing all established radio bearers corresponding to the user equipment as second-type radio bearers, acquire identity information of the radio bearer, identity information of an evolved packet system bearer corresponding to the identity information of the radio bearer, a first radio bearer release list, and a second radio bearer establishment and modification list, add the identity information of the radio bearer to the first radio bearer release list, add the identity information of the evolved packet system bearer to the second radio bearer establishment and modification list, and generate a first message that includes the first radio bearer release list and the second radio bearer establishment and modification list.

Optionally, the processor 51 is configured to: when determining that the configuration type is re-establishing all established radio bearers corresponding to the user equipment as second-type radio bearers, acquire identity information of the radio bearer, identity information of an evolved packet system bearer corresponding to the identity information of the radio bearer, a second radio bearer release list, and a second radio bearer establishment and modification list, add the identity information of the radio bearer to the second radio bearer release list, add the identity information of the evolved packet system bearer to the second radio bearer establishment and modification list, and generate a first message that includes the second radio bearer release list and the second radio bearer establishment and modification list.

Optionally, the processor 51 is configured to: when determining that the configuration type is re-establishing all established radio bearers corresponding to the user equipment as second-type radio bearers, acquire identity information of an evolved packet system bearer, a first radio bearer release list, and a second radio bearer establishment and modification list, add the identity information of the evolved packet system bearer to the first radio bearer release list and the second radio bearer establishment and modification list, and generate a first message that includes the first radio bearer release list and the second radio bearer establishment and modification list.

Optionally, the processor 51 is configured to: when determining that the configuration type is re-establishing all established radio bearers corresponding to the user equipment as second-type radio bearers, acquire identity information of an evolved packet system bearer, a second radio bearer release list, and a second radio bearer establishment and modification list, add the identity information of the evolved packet system bearer to the second radio bearer release list and the second radio bearer establishment and modification list, and generate a first message that includes the second radio bearer release list and the second radio bearer establishment and modification list.

Optionally, the processor 51 is configured to: when determining that the configuration type is re-establishing all established radio bearers corresponding to the user equipment as second-type radio bearers, acquire identity information of the radio bearer, a secondary cell group release identity, and a second radio bearer establishment and modification list, add the identity information of the radio bearer to the second radio bearer establishment and modification list, and generate a first message that includes the secondary cell group release identity and the second radio bearer establishment and modification list.

Optionally, the processor 51 is configured to: when determining that the configuration type is re-establishing all established radio bearers corresponding to the user equipment as second-type radio bearers, acquire identity information of an evolved packet system bearer, a secondary cell group release identity, and a second radio bearer establishment and modification list, add the identity information of the evolved packet system bearer to the second radio bearer establishment and modification list, and generate a first message that includes the secondary cell group release identity and the second radio bearer establishment and modification list.

Optionally, the processor 51 is configured to: when determining that the configuration type is re-establishing all established radio bearers corresponding to the user equipment as third-type radio bearers, generate a first message including a third re-establishment identity.

Optionally, the processor 51 is configured to: when determining that the configuration type is re-establishing all established radio bearers corresponding to the user equipment as third-type radio bearers, acquire identity information of the radio bearer and a third-type radio bearer re-establishment list, add the identity information to the third-type radio bearer re-establishment list, and generate a first message including the third-type radio bearer re-establishment list.

Optionally, the processor 51 is configured to: when determining that the configuration type is re-establishing all established radio bearers corresponding to the user equipment as third-type radio bearers, acquire identity information of the radio bearer, a first radio bearer release list, a first radio bearer establishment and modification list, and a second radio bearer establishment and modification list, add the identity information of the radio bearer to the first radio bearer release list, the first radio bearer establishment and modification list, and the second radio bearer establishment and modification list, and generate a first message that includes the first radio bearer release list, the first radio bearer establishment and modification list, and the second radio bearer establishment and modification list.

Optionally, the processor 51 is configured to: when determining that the configuration type is re-establishing all established radio bearers corresponding to the user equipment as third-type radio bearers, acquire identity information of the radio bearer, a first radio bearer release list, a second radio bearer release list, a first radio bearer establishment and modification list, and a second radio bearer establishment and modification list, add the identity information of the radio bearer to the first radio bearer release list, the second radio bearer release list, the first radio bearer establishment and modification list, and the second radio bearer establishment and modification list, and generate a first message that includes the first radio bearer release list, the second radio bearer release list, the first radio bearer establishment and modification list, and the second radio bearer establishment and modification list.

Optionally, the processor 51 is configured to: when determining that the configuration type is re-establishing all established radio bearers corresponding to the user equipment as third-type radio bearers, acquire first identity information of the radio bearer, second identity information of the radio bearer, identity information of an evolved packet system bearer corresponding to the first identity information of the radio bearer, a first radio bearer release list, a first radio bearer establishment and modification list, and a second radio bearer establishment and modification list, add the first identity information of the radio bearer to the first radio bearer release list, add the first identity information of the radio bearer, the second identity information of the radio bearer, and the identity information of the evolved packet system bearer to the first radio bearer establishment and modification list, add the second identity information of the radio bearer to the second radio bearer establishment and modification list, and generate a first message that includes the first radio bearer release list, the first radio bearer establishment and modification list, and the second radio bearer establishment and modification list.

Optionally, the processor 51 is configured to: when determining that the configuration type is re-establishing all established radio bearers corresponding to the user equipment as third-type radio bearers, acquire first identity information of the radio bearer, second identity information of the radio bearer, identity information of an evolved packet system bearer corresponding to the first identity information of the radio bearer, a first radio bearer release list, a second radio bearer release list, a first radio bearer establishment and modification list, and a second radio bearer establishment and modification list, add the first identity information of the radio bearer to the first radio bearer release list and the second radio bearer release list, add the second identity information of the radio bearer and the identity information of the evolved packet system bearer to the first radio bearer establishment and modification list, add the second identity information of the radio bearer to the second radio bearer establishment and modification list, and generate a first message that includes the first radio bearer release list, the second radio bearer release list, the first radio bearer establishment and modification list, and the second radio bearer establishment and modification list.

Optionally, the processor 51 is configured to: when determining that the configuration type is re-establishing all established radio bearers corresponding to the user equipment as third-type radio bearers, acquire identity information of an evolved packet system bearer, identity information of a radio bearer corresponding to the evolved packet system bearer, a first radio bearer release list, a first radio bearer establishment and modification list, and a second radio bearer establishment and modification list, add the identity information of the evolved packet system bearer to the first radio bearer release list, add the identity information of the evolved packet system bearer and the identity information of the radio bearer to the first radio bearer establishment and modification list, add the identity information of the radio bearer to the second radio bearer establishment and modification list, and generate a first message that includes the first radio bearer release list, the first radio bearer establishment and modification list, and the second radio bearer establishment and modification list.

Optionally, the processor 51 is configured to: when determining that the configuration type is re-establishing all established radio bearers corresponding to the user equipment as third-type radio bearers, acquire identity information of an evolved packet system bearer, identity information of a radio bearer corresponding to the evolved packet system bearer, a first radio bearer release list, a second radio bearer release list, a first radio bearer establishment and modification list, and a second radio bearer establishment and modification list, add the identity information of the evolved packet system bearer to the first radio bearer release list and the second radio bearer release list, add the identity information of the evolved packet system bearer and the identity information of the radio bearer to the first radio bearer establishment and modification list, add the identity information of the radio bearer to the second radio bearer establishment and modification list, and generate a first message that includes the first radio bearer release list, the second radio bearer release list, the first radio bearer establishment and modification list, and the second radio bearer establishment and modification list.

Optionally, the processor 51 is configured to: when determining that the configuration type is re-establishing all established radio bearers corresponding to the user equipment as third-type radio bearers, acquire identity information of the radio bearer, a master cell group release identity, a first radio bearer establishment and modification list, and a second radio bearer establishment and modification list, add the identity information of the radio bearer to the first radio bearer establishment and modification list and the second radio bearer establishment and modification list, and generate a first message that includes the master cell group release identity, the first radio bearer establishment and modification list, and the second radio bearer establishment and modification list.

Optionally, the processor 51 is configured to: when determining that the configuration type is re-establishing all established radio bearers corresponding to the user equipment as third-type radio bearers, acquire identity information of the radio bearer, a secondary cell group release identity, a first radio bearer establishment and modification list, and a second radio bearer establishment and modification list, add the identity information of the radio bearer to the first radio bearer establishment and modification list and the second radio bearer establishment and modification list, and generate a first message that includes the secondary cell group release identity, the first radio bearer establishment and modification list, and the second radio bearer establishment and modification list.

Optionally, the processor 51 is configured to: when determining that the configuration type is re-establishing all established radio bearers corresponding to the user equipment as third-type radio bearers, acquire identity information of an evolved packet system bearer, identity information of a radio bearer corresponding to the identity information of the evolved packet system bearer, a master cell group release identity, a first radio bearer establishment and modification list, and a second radio bearer establishment and modification list, add the identity information of the evolved packet system bearer and the identity information of the radio bearer to the first radio bearer establishment and modification list, add the identity information of the radio bearer to the second radio bearer establishment and modification list, and generate a first message that includes the master cell group release identity, the first radio bearer establishment and modification list, and the second radio bearer establishment and modification list.

Optionally, the processor 51 is configured to: when determining that the configuration type is re-establishing all established radio bearers corresponding to the user equipment as third-type radio bearers, acquire identity information of an evolved packet system bearer, identity information of a radio bearer corresponding to the identity information of the evolved packet system bearer, a secondary cell group release identity, a first radio bearer establishment and modification list, and a second radio bearer establishment and modification list, add the identity information of the evolved packet system bearer and the identity information of the radio bearer to the first radio bearer establishment and modification list, add the identity information of the radio bearer to the second radio bearer establishment and modification list, and generate a first message that includes the secondary cell group release identity, the first radio bearer establishment and modification list, and the second radio bearer establishment and modification list.

Optionally, the processor 51 is configured to: when determining that the configuration type is establishing or reconfiguring the MAC entity corresponding to the secondary cell group, acquire an identity of the secondary cell group and a secondary cell group establishment and modification list, add the identity of the secondary cell group to the secondary cell group establishment and modification list, and generate a first message including the secondary cell group establishment and modification list.

Optionally, the processor 51 is configured to: when determining that the configuration type is establishing or reconfiguring the MAC entity corresponding to the secondary cell group, acquire a secondary cell group establishment and modification identity, and generate a first message including the secondary cell group establishment and modification identity.

Optionally, the processor 51 is configured to: when determining that the configuration type is establishing or reconfiguring the MAC entity corresponding to the secondary cell group, acquire a secondary MAC configuration identity, and generate a first message including the secondary MAC configuration identity.

Optionally, the processor 51 is configured to: when determining that the configuration type is releasing the MAC entity corresponding to the secondary cell group, acquire an identity of the secondary cell group and a secondary cell group release list, add the identity of the secondary cell group to the secondary cell group release list, and generate a first message including the secondary cell group release list.

Optionally, the processor 51 is configured to: when determining that the configuration type is releasing the MAC entity corresponding to the secondary cell group, acquire a secondary cell group release identity, and generate a first message including the secondary cell group release identity.

Optionally, the processor 51 is configured to: when determining that the configuration type is releasing the MAC entity corresponding to the secondary cell group, acquire a secondary MAC release identity, and generate a first message including the secondary MAC release identity.

Optionally, the processor 51 is configured to: when determining that the configuration type is resetting the MAC entity corresponding to the secondary cell group, acquire an identity of the secondary cell group, a secondary cell group establishment and modification list, and a secondary cell group release list, add the identity of the secondary cell group to the secondary cell group establishment and modification list and the secondary cell group release list, and generate a first message that includes the secondary cell group establishment and modification list and the secondary cell group release list.

Optionally, the processor 51 is configured to: when determining that the configuration type is resetting the MAC entity corresponding to the secondary cell group, acquire a secondary cell group establishment and modification identity and a secondary cell group release identity, and generate a first message that includes the secondary cell group establishment and modification identity and the secondary cell group release identity.

Optionally, the processor 51 is configured to: when determining that the configuration type is resetting the MAC entity corresponding to the secondary cell group, acquire a secondary MAC configuration identity and a secondary cell group release identity, and generate a first message that includes the secondary MAC configuration identity and the secondary cell group release identity.

Optionally, the processor 51 is configured to: when determining that the configuration type is resetting the MAC entity corresponding to the secondary cell group, acquire a secondary MAC configuration identity and a secondary MAC release identity, and generate a first message that includes the secondary MAC configuration identity and the secondary MAC release identity.

Optionally, the processor 51 is configured to: when determining that the configuration type is resetting the MAC entity corresponding to the secondary cell group, acquire a secondary cell group reset identity, and generate a first message including the secondary cell group reset identity.

Optionally, the processor 51 is configured to: when determining that the configuration type is resetting the MAC entity corresponding to the secondary cell group, acquire a secondary MAC reset identity, and generate a first message including the secondary MAC reset identity.

It should be noted that, the communications interface of the network device 50 includes a transceiver, and the processor 51 may implement, by using the transceiver, the method in the method embodiment shown in FIG. 3.

A person skilled in the art may clearly understand that, for the specific operating process and description of the network device 50, refer to the corresponding process in the foregoing method embodiment for the convenience and conciseness of the description, and no further details are provided herein again.

An embodiment provides user equipment 60. As shown in FIG. 6, the user equipment 60 includes: a processor 61, a communications interface 62, a memory 63, and a communications bus 64, where the processor 61, the communications interface 62, and the memory 63 communicate with each other by using the communications bus 64.

The processor 61 may be a central processing unit CPU, or an application specific integrated circuit ASIC (Application Specific Integrated Circuit), or one or more integrated circuits configured to implement the embodiments.

The memory 63 is configured to store executable program code, where the program code includes a computer executable instruction. The memory 63 may include a high-speed RAM memory, and may further include a non-volatile memory, for example, at least one magnetic disk memory.

The communications interface 62 is configured to implement connection communication between apparatuses.

The processor 61 executes the program code, to receive a first message sent by a network device, determine, according to the first message, a configuration type for configuring a radio bearer or a MAC entity, and configure the radio bearer or the MAC entity according to the configuration type.

The first message is used for instructing the user equipment to configure the radio bearer or configure a MAC entity corresponding to a secondary cell group, and the configuration type refers to an operation that user equipment needs to perform on the radio bearer or on the MAC entity corresponding to the secondary cell group.

Optionally, the processor 61 is configured to: if the first message includes a first radio bearer establishment and modification list, the first radio bearer establishment and modification list includes identity information of the radio bearer, and the identity information of the radio bearer is not in current configuration of the user equipment, determine that the configuration type is establishing a first-type radio bearer.

Optionally, the processor 61 is configured to: if the first message includes a second radio bearer establishment and modification list, the second radio bearer establishment and modification list includes identity information of the radio bearer, and the identity information of the radio bearer is not in current configuration of the user equipment, determine that the configuration type is establishing a second-type radio bearer.

Optionally, the processor 61 is configured to: if the first message includes a first radio bearer establishment and modification list and a second radio bearer establishment and modification list, the first radio bearer establishment and modification list includes identity information of the radio bearer, the second radio bearer establishment and modification list includes the identity information of the radio bearer, and the identity information of the radio bearer is not in current configuration of the user equipment, determine that the configuration type is establishing a third-type radio bearer.

Optionally, the processor 61 is configured to: if the first message includes a first radio bearer establishment and modification list, the first radio bearer establishment and modification list includes identity information of the radio bearer, and the identity information of the radio bearer is in current configuration of the user equipment, determine that the configuration type is reconfiguring the radio bearer.

Optionally, the processor 61 is configured to: if the first message includes a second radio bearer establishment and modification list, the second radio bearer establishment and modification list includes identity information of the radio bearer, and the identity information of the radio bearer is in current configuration of the user equipment, determine that the configuration type is reconfiguring the radio bearer.

Optionally, the processor 61 is configured to: if the first message includes a first radio bearer establishment and modification list and a second radio bearer establishment and modification list, the first radio bearer establishment and modification list includes identity information of the radio bearer, the second radio bearer establishment and modification list includes the identity information of the radio bearer, and the identity information of the radio bearer is in current configuration of the user equipment, determine that the configuration type is reconfiguring the radio bearer.

Optionally, the processor 61 is configured to: if the first message includes a first radio bearer release list, the first radio bearer release list includes identity information of the radio bearer, and the identity information of the radio bearer is in current configuration of the user equipment, determine that the configuration type is releasing the radio bearer.

Optionally, the processor 61 is configured to: if the first message includes a second radio bearer release list, the second radio bearer release list includes identity information of the radio bearer, and the identity information of the radio bearer is in current configuration of the user equipment, determine that the configuration type is releasing the radio bearer.

Optionally, the processor 61 is configured to: if the first message includes a first radio bearer release list and a second radio bearer release list, the first radio bearer release list and the second radio bearer release list both include identity information of the radio bearer, and the identity information of the radio bearer is in current configuration of the user equipment, determine that the configuration type is releasing the radio bearer.

Optionally, the processor 61 is configured to: if the first message includes a first re-establishment identity, determine that the configuration type is re-establishing all radio bearers as first-type radio bearers.

Optionally, the processor 61 is configured to: if the first message includes a second re-establishment identity, determine that the configuration type is re-establishing all radio bearers as second-type radio bearers.

Optionally, the processor 61 is configured to: if the first message includes a third re-establishment identity, determine that the configuration type is re-establishing all radio bearers as third-type radio bearers.

Optionally, the processor 61 is configured to: if the first message includes a first-type radio bearer re-establishment list, the first-type radio bearer re-establishment list includes identity information of the radio bearer, and the identity information of the radio bearer is in current configuration of the user equipment, determine that the configuration type is re-establishing the radio bearer as a first-type radio bearer.

Optionally, the processor 61 is configured to: if the first message includes a second-type radio bearer re-establishment list, the second-type radio bearer re-establishment list includes identity information of the radio bearer, and the identity information of the radio bearer is in current configuration of the user equipment, determine that the configuration type is re-establishing the radio bearer as a second-type radio bearer.

Optionally, the processor 61 is configured to: if the first message includes a third-type radio bearer re-establishment list, the third-type radio bearer re-establishment list includes identity information of the radio bearer, and the identity information of the radio bearer is in current configuration of the user equipment, determine that the configuration type is re-establishing the radio bearer as a third-type radio bearer.

Optionally, the processor 61 is configured to: if the first message includes a first radio bearer release list and a first radio bearer establishment and modification list, the first radio bearer release list and the first radio bearer establishment and modification list both include identity information of the radio bearer, and the identity information of the radio bearer is in current configuration of the user equipment, determine that the configuration type is re-establishing the radio bearer as a first-type radio bearer.

Optionally, the processor 61 is configured to: if the first message includes a first radio bearer release list and a second radio bearer establishment and modification list, the first radio bearer release list and the second radio bearer establishment and modification list both include identity information of the radio bearer, and the identity information of the radio bearer is in current configuration of the user equipment, determine that the configuration type is re-establishing the radio bearer as a second-type radio bearer.

Optionally, the processor 61 is configured to: if the first message includes a second radio bearer release list and a second radio bearer establishment and modification list, the second radio bearer release list and the second radio bearer establishment and modification list both include identity information of the radio bearer, and the identity information of the radio bearer is in current configuration of the user equipment, determine that the configuration type is re-establishing the radio bearer as a second-type radio bearer.

Optionally, the processor 61 is configured to: if the first message includes a first radio bearer release list, a first radio bearer establishment and modification list, and a second radio bearer establishment and modification list, the first radio bearer release list, the first radio bearer establishment and modification list, and the second radio bearer establishment and modification list all include identity information of the radio bearer, and the identity information of the radio bearer is in current configuration of the user equipment, determine that the configuration type is re-establishing the radio bearer as a third-type radio bearer.

Optionally, the processor 61 is configured to: if the first message includes a first radio bearer release list, a second radio bearer release list, a first radio bearer establishment and modification list, and a second radio bearer establishment and modification list, the first radio bearer release list, the second radio bearer release list, the first radio bearer establishment and modification list, and the second radio bearer establishment and modification list all include identity information of the radio bearer, and the identity information of the radio bearer is in current configuration of the user equipment, determine that the configuration type is re-establishing the radio bearer as a third-type radio bearer.

Optionally, the processor 61 is configured to: if the first message includes a first radio bearer release list and a first radio bearer establishment and modification list, the first radio bearer release list includes identity information of the radio bearer, the first radio bearer establishment and modification list includes identity information of an evolved packet system bearer corresponding to the identity information of the radio bearer, and the identity information of the radio bearer is in current configuration of the user equipment, determine that the configuration type is re-establishing the radio bearer as a first-type radio bearer.

Optionally, the processor 61 is configured to: if the first message includes a first radio bearer release list and a second radio bearer establishment and modification list, the first radio bearer release list includes identity information of the radio bearer, the second radio bearer establishment and modification list includes identity information of an evolved packet system bearer corresponding to the identity information of the radio bearer, and the identity information of the radio bearer is in current configuration of the user equipment, determine that the configuration type is re-establishing the radio bearer as a second-type radio bearer.

Optionally, the processor 61 is configured to: if the first message includes a second radio bearer release list and a second radio bearer establishment and modification list, the second radio bearer release list includes identity information of the radio bearer, the second radio bearer establishment and modification list includes identity information of an evolved packet system bearer corresponding to the identity information of the radio bearer, and the identity information of the radio bearer is in current configuration of the user equipment, determine that the configuration type is re-establishing the radio bearer as a second-type radio bearer.

Optionally, the processor 61 is configured to: if the first message includes a first radio bearer release list, a first radio bearer establishment and modification list, and a second radio bearer establishment and modification list, the first radio bearer release list includes first identity information of the radio bearer, the first radio bearer establishment and modification list includes identity information of an evolved packet system bearer corresponding to the first identity information of the radio bearer and includes second identity information of the radio bearer, the second radio bearer establishment and modification list includes the second identity information of the radio bearer, and the first identity information of the radio bearer is in current configuration of the user equipment, determine that the configuration type is re-establishing the radio bearer as a third-type radio bearer.

Optionally, the processor 61 is configured to: if the first message includes a first radio bearer release list, a second radio bearer release list, a first radio bearer establishment and modification list, and a second radio bearer establishment and modification list, the first radio bearer release list and the second radio bearer release list both include first identity information of the radio bearer, the first radio bearer establishment and modification list includes identity information of an evolved packet system bearer corresponding to the first identity information of the radio bearer and includes second identity information of the radio bearer, the second radio bearer establishment and modification list includes the second identity information of the radio bearer, and the first identity information of the radio bearer is in current configuration of the user equipment, determine that the configuration type is re-establishing the radio bearer as a third-type radio bearer.

Optionally, the processor 61 is configured to: if the first message includes a first radio bearer release list and a first radio bearer establishment and modification list, the first radio bearer release list includes identity information of an evolved packet system bearer, the first radio bearer establishment and modification list includes the identity information of the evolved packet system bearer, and the identity information of the evolved packet system bearer is in current configuration of the user equipment, determine that the configuration type is re-establishing a radio bearer corresponding to the evolved packet system bearer as a first-type radio bearer.

Optionally, the processor 61 is configured to: if the first message includes a first radio bearer release list and a second radio bearer establishment and modification list, the first radio bearer release list includes identity information of an evolved packet system bearer, the second radio bearer establishment and modification list includes the identity information of the evolved packet system bearer, and the identity information of the evolved packet system bearer is in current configuration of the user equipment, determine that the configuration type is re-establishing a radio bearer corresponding to the evolved packet system bearer as a second-type radio bearer.

Optionally, the processor 61 is configured to: if the first message includes a second radio bearer release list and a second radio bearer establishment and modification list, the second radio bearer release list includes identity information of an evolved packet system bearer, the second radio bearer establishment and modification list includes the identity information of the evolved packet system bearer, and the identity information of the evolved packet system bearer is in current configuration of the user equipment, determine that the configuration type is re-establishing a radio bearer corresponding to the evolved packet system bearer as a second-type radio bearer.

Optionally, the processor 61 is configured to: if the first message includes a first radio bearer release list, a first radio bearer establishment and modification list, and a second radio bearer establishment and modification list, the first radio bearer release list includes identity information of an evolved packet system bearer, the first radio bearer establishment and modification list includes the identity information of the evolved packet system bearer and includes identity information of a radio bearer corresponding to the evolved packet system bearer, the second radio bearer establishment and modification list includes the identity information of the radio bearer, and the identity information of the evolved packet system bearer is in current configuration of the user equipment, determine that the configuration type is re-establishing a radio bearer corresponding to the evolved packet system bearer as a third-type radio bearer.

Optionally, the processor 61 is configured to: if the first message includes a first radio bearer release list, a second radio bearer release list, a first radio bearer establishment and modification list, and a second radio bearer establishment and modification list, the first radio bearer release list and the second radio bearer release list both include identity information of an evolved packet system bearer, the first radio bearer establishment and modification list includes the identity information of the evolved packet system bearer and includes identity information of a radio bearer corresponding to the evolved packet system bearer, the second radio bearer establishment and modification list includes the identity information of the radio bearer, and the identity information of the evolved packet system bearer is in current configuration of the user equipment, determine that the configuration type is re-establishing the radio bearer corresponding to the evolved packet system bearer as a third-type radio bearer.

Optionally, the processor 61 is configured to: if the first message includes a master cell group release identity and a first radio bearer establishment and modification list, the first radio bearer establishment and modification list includes identity information of the radio bearer, and the identity information of the radio bearer is in current configuration of the user equipment, determine that the configuration type is re-establishing the radio bearer as a first-type radio bearer.

Optionally, the processor 61 is configured to: if the first message includes a secondary cell group release identity and a second radio bearer establishment and modification list, the second radio bearer establishment and modification list includes identity information of the radio bearer, and the identity information of the radio bearer is in current configuration of the user equipment, determine that the configuration type is re-establishing the radio bearer as a second-type radio bearer.

Optionally, the processor 61 is configured to: if the first message includes a master cell group release identity, a first radio bearer establishment and modification list, and a second radio bearer establishment and modification list, the first radio bearer establishment and modification list and the second radio bearer establishment and modification list both include identity information of the radio bearer, and the identity information of the radio bearer is in current configuration of the user equipment, determine that the configuration type is re-establishing the radio bearer as a third-type radio bearer.

Optionally, the processor 61 is configured to: if the first message includes a secondary cell group release identity, a first radio bearer establishment and modification list, and a second radio bearer establishment and modification list, the first radio bearer establishment and modification list and the second radio bearer establishment and modification list both include identity information of the radio bearer, and the identity information of the radio bearer is in current configuration of the user equipment, determine that the configuration type is re-establishing the radio bearer as a third-type radio bearer.

Optionally, the processor 61 is configured to: if the first message includes a master cell group release identity and a first radio bearer establishment and modification list, the first radio bearer establishment and modification list includes identity information of an evolved packet system bearer, and the identity information of the evolved packet system bearer is in current configuration of the user equipment, determine that the configuration type is re-establishing a radio bearer corresponding to the evolved packet system bearer as a first-type radio bearer.

Optionally, the processor 61 is configured to: if the first message includes a secondary cell group release identity and a second radio bearer establishment and modification list, the second radio bearer establishment and modification list includes identity information of an evolved packet system bearer, and the identity information of the evolved packet system bearer is in current configuration of the user equipment, determine that the configuration type is re-establishing a radio bearer corresponding to the evolved packet system bearer as a second-type radio bearer.

Optionally, the processor 61 is configured to: if the first message includes a master cell group release identity, a first radio bearer establishment and modification list, and a second radio bearer establishment and modification list, the first radio bearer establishment and modification list includes identity information of an evolved packet system bearer and includes identity information of a radio bearer corresponding to the identity information of the evolved packet system bearer, the second radio bearer establishment and modification list includes the identity information of the radio bearer, and the identity information of the evolved packet system bearer is in current configuration of the user equipment, determine that the configuration type is re-establishing the radio bearer as a third-type radio bearer.

Optionally, the processor 61 is configured to: if the first message includes a secondary cell group release identity, a first radio bearer establishment and modification list, and a second radio bearer establishment and modification list, the first radio bearer establishment and modification list includes identity information of an evolved packet system bearer and includes identity information of a radio bearer corresponding to the identity information of the evolved packet system bearer, the second radio bearer establishment and modification list includes the identity information of the radio bearer, and the identity information of the evolved packet system bearer is in current configuration of the user equipment, determine that the configuration type is re-establishing a radio bearer corresponding to the evolved packet system bearer as a third-type radio bearer.

Optionally, the processor 61 is configured to: if the first message includes a secondary cell group establishment and modification list, the secondary cell group establishment and modification list includes an identity of the secondary cell group, and the identity of the secondary cell group is not in current configuration of the user equipment, determine that the configuration type is establishing the MAC entity corresponding to the secondary cell group.

Optionally, the processor 61 is configured to: if the first message includes a secondary cell group establishment and modification list, the secondary cell group establishment and modification list includes an identity of the secondary cell group, and the identity of the secondary cell group is in current configuration of the user equipment, determine that the configuration type is reconfiguring the MAC entity corresponding to the secondary cell group.

Optionally, the processor 61 is configured to: if the first message includes a secondary cell group release list, the secondary cell group release list includes an identity of the secondary cell group, and the identity of the secondary cell group is in current configuration of the user equipment, determine that the configuration type is releasing the MAC entity corresponding to the secondary cell group.

Optionally, the processor 61 is configured to: if the first message includes a secondary cell group establishment and modification list and a secondary cell group release list, the secondary cell group establishment and modification list and the secondary cell group release list both include an identity of the secondary cell group, and the identity of the secondary cell group is in current configuration of the user equipment, determine that the configuration type is resetting the MAC entity corresponding to the secondary cell group.

Optionally, the processor 61 is configured to: if the first message includes a secondary cell group establishment and modification identity or a secondary MAC configuration identity, and the MAC entity corresponding to the secondary cell group is not established, determine that the configuration type is establishing the MAC entity.

Optionally, the processor 61 is configured to: if the first message includes a secondary cell group establishment and modification identity or a secondary MAC configuration identity, and the MAC entity corresponding to the secondary cell group is already established, determine that the configuration type is reconfiguring the MAC entity.

Optionally, the processor 61 is configured to: if the first message includes a secondary cell group release identity or a secondary MAC release identity, and the MAC entity corresponding to the secondary cell group is already established, determine that the configuration type is releasing the MAC entity.

Optionally, the processor 61 is configured to: if the first message includes a secondary cell group establishment and modification identity and a secondary cell group release identity, and the MAC entity corresponding to the secondary cell group is already established, determine that the configuration type is resetting the MAC entity.

Optionally, the processor 61 is configured to: if the first message includes a secondary MAC configuration identity and a secondary cell group release identity, and the MAC entity corresponding to the secondary cell group is already established, determine that the configuration type is resetting the MAC entity.

Optionally, the processor 61 is configured to: if the first message includes a secondary MAC configuration identity and a secondary MAC release identity, and the MAC entity corresponding to the secondary cell group is already established, determine that the configuration type is resetting the MAC entity.

Optionally, the processor 61 is configured to: if the first message includes a secondary cell group reset identity or a secondary MAC reset identity, and the MAC entity corresponding to the secondary cell group is already established, determine that the configuration type is resetting the MAC entity.

A person skilled in the art may clearly understand that, for the specific operating process and description of the user equipment 60, refer to the corresponding process in the foregoing method embodiment for the convenience and conciseness of the description, and no further details are provided herein again.

It should be noted that, the communications interface of the user equipment 60 includes a transceiver, and the processor 61 may implement, by using the transceiver, the method in the method embodiment shown in FIG. 4.

The foregoing descriptions are merely specific implementation manners of the embodiments, but are not intended to limit the protection scope of the embodiments. Any variation or replacement readily figured out by a person skilled in the art within the technical scope disclosed in the embodiments shall fall within the protection scope of the embodiments. Therefore, the protection scope of the embodiments shall be subject to the protection scope of the claims.

What is claimed is:

1. A user equipment, comprising:
 a processor; and
 a non-transitory computer readable storage medium storing a program for execution by the processor, the program including instructions to:
 receive a first message, wherein the first message instructs the user equipment to configure a radio bearer;
 determine to establish a third-type radio bearer in response to the first message comprising a first radio bearer establishment and modification list, and a second radio bearer establishment and modification list, the first radio bearer establishment and modification list comprising identity information of the radio bearer, and the second radio bearer establishment and modification list comprising the identity information of the radio bearer, and in response to the identity information of the radio bearer being absent from a current configuration of the user equipment;

and
configure the third-type radio bearer, wherein the third-type radio bearer is served by a master cell group of a master base station, and by a secondary cell group of a secondary base station.

2. The user equipment according to claim 1, wherein the first message is a radio resource control message.

3. A method comprising:
receiving, by a user equipment, a first message, wherein the first message instructs the user equipment to configure a radio bearer;
determining, by the user equipment, to establish a third-type radio bearer, in response to the first message comprising a first radio bearer establishment and modification list, and a second radio bearer establishment and modification list, the first radio bearer establishment and modification list comprising identity information of the radio bearer, and the second radio bearer establishment and modification list comprising the identity information of the radio bearer, and in response to the identity information of the radio bearer being absent from a current configuration of the user equipment;
and
configuring the third-type radio bearer, wherein the third-type radio bearer is served by a master cell group of a master base station, and by a secondary cell group of a secondary base station.

4. The method according to claim 3, wherein the first message is a radio resource control message.

5. A non-transitory computer-readable medium storing instructions that, when executed by a user equipment, cause the user equipment to:
receive a first message, wherein the first message instructs the user equipment to configure a radio bearer;
determine to establish a third-type radio bearer in response to the first message comprising a first radio bearer establishment and modification list, and a second radio bearer establishment and modification list, the first radio bearer establishment and modification list comprising identity information of the radio bearer, and the second radio bearer establishment and modification list comprising the identity information of the radio bearer, and in response to the identity information of the radio bearer being absent from a current configuration of the user equipment; and
configure the third-type radio bearer, wherein the third-type radio bearer is served by a master cell group of a master base station, and by a secondary cell group of a secondary base station.

6. The non-transitory computer-readable medium according to claim 5, wherein the first message is a radio resource control message.

* * * * *